United States Patent
Tan

(10) Patent No.: US 9,971,091 B2
(45) Date of Patent: May 15, 2018

(54) OPTICAL DEVICES AND METHODS FOR FABRICATING AN OPTICAL DEVICE

(71) Applicant: Singapore University Of Technology And Design, Singapore (SG)

(72) Inventor: Dawn Tan, Singapore (SG)

(73) Assignee: Singapore University Of Technology And Design, Singapore (SG)

( * ) Notice: Subject to any disclaimer, the term of this patent is extended or adjusted under 35 U.S.C. 154(b) by 0 days. days.

(21) Appl. No.: 15/461,647

(22) Filed: Mar. 17, 2017

(65) Prior Publication Data
US 2017/0269303 A1    Sep. 21, 2017

Related U.S. Application Data

(60) Provisional application No. 62/310,046, filed on Mar. 18, 2016.

(51) Int. Cl.
G02B 6/12         (2006.01)
G02B 6/26         (2006.01)
G02B 6/125        (2006.01)

(52) U.S. Cl.
CPC ............... *G02B 6/26* (2013.01); *G02B 6/125* (2013.01); *G02B 2006/1209* (2013.01); *G02B 2006/12107* (2013.01); *G02B 2006/12109* (2013.01); *G02B 2006/12164* (2013.01)

(58) Field of Classification Search
CPC ................ G02B 6/26; G02B 6/125; G02B 2006/12109; G02B 2006/1209; G02B 2006/12164; G02B 2006/12107
See application file for complete search history.

(56) References Cited

U.S. PATENT DOCUMENTS

| 5,504,772 A | * | 4/1996 | Deacon | H01S 3/063 372/102 |
| 9,671,673 B2 | * | 6/2017 | Tan | G02F 1/365 |
| 2009/0317032 A1 | * | 12/2009 | D'Alessandro | G02F 1/1326 385/2 |

OTHER PUBLICATIONS

R. S. Tucker et al., Optical time-division multiplexing for very high bit-rate transmission, Journal of Lightwave Technology, vol. 6, No. 11, Nov. 1988, p. 1737-1749.

(Continued)

*Primary Examiner* — Ellen Kim
(74) *Attorney, Agent, or Firm* — Viering Jentschura & Partner MBB

(57) ABSTRACT

According to various embodiments, there is provided an optical device including: a waveguide configured to propagate an electromagnetic wave, the waveguide including a first grating and further including a second grating; a first further waveguide including a first further grating, the first further waveguide having a first width, wherein the first further grating is coupled to the first grating to form a first pair of coupled gratings, wherein a grating period of the first further grating is at least substantially equal to a grating period of the first grating; a second further waveguide including a second further grating, the second further waveguide having a second width, wherein the second further grating is coupled to the second grating to form a second pair of coupled gratings, wherein a grating period of the second further grating is at least substantially equal to a grating period of the second grating.

19 Claims, 11 Drawing Sheets

(56) References Cited

OTHER PUBLICATIONS

S. Kawanishi, Ultrahigh-speed optical time-division-multiplexed transmission technology based on optical signal processing, IEEE Journal of Quantum Electronics, vol. 34., No. 11, Nov. 1998, p. 2064-2079.

D. T. H. Tan et al., Wide bandwidth, low loss 1 by 4 wavelenght division multiplexer on silicon for optical interconnects, Optics Express, vol. 19, No. 3, Jan. 25, 2011, p. 2401-2409.

D. T. H. Tan et al., Towards 100 channel dense wavelength division multiplexing with 100GHz spacing on silicon, Optics Express, vol. 22, No. 9, Apr. 22, 2014, p. 10408-10415.

F. Xia et al., Ultra-compact wavelength division multiplexing devices using silicon photonic wires for on-chip interconnects, in Optical Fiber Communication Conference and Exposition and the National Fiber Optic Engineers Conference, OSA Technical Digest Series (CD) (Optical Society of America), 2006, paper OWG2.

C. P. Chen et al., Experimental Demonstration of Spatial Scaling for High-Throughput Transmission Through a Si Mode-Division-Multiplexing Waveguide, in Advanced Photonics for Communications, OSA Technical Digest Series (CD) (Optical Society of America), 2014, paper IM2A.3.

L.-W. Luo et al., WDM-compatible mode-division multiplexing on a silicon chip, Nature Communications, 5, 3069, Jan. 15, 2014.

J. Wang et al., On-chip silicon 8-channel hybrid (de)multiplexer enabling simultaneous mode- and polarization-division-multiplexing, Laser & Photonics Reviews 8, No. 2, 2014, p. L18-L22.

H. Qiu et al., Silicon mode multi/demultiplexer based on multimode grating-assisted couplers, Optics Express, vol. 21, No. 15, Jul. 18, 2013, p. 17904-17911.

S. G. Evangelides et al., Polarization multiplexing with solitons, Journal of Lightwave Technology, vol. 10, No. 1, Jan. 1992, p. 28-35.

X. S. Yao et al., All-optic scheme for automatic polarization division demultiplexing, Optics Express, vol. 15, No. 12, Jun. 1, 2007, p. 7407-7414.

N. Bozinovic et al., Terabit-scale orbital angular momentum mode division multiplexing in fibers, Science, vol. 340, Jun. 28, 2013, p. 1545-1548.

B. Guan et al., Free space coherent optical communication with orbital angular, momentum multiplexing/demultiplexing using a hybrid 3D photonic integrated circuit, Optics Express, vol. 22, No. 1, Dec. 13, 2013, p. 145-156.

D. T. H. Tan et al., Coupled chirped vertical gratings for on chip group velocity dispersion engineering, Applied Physics Letters, 95, 141109-01, Oct. 8, 2009.

D. T. H. Tan et al., Chip-scale dispersion engineering using chirped vertical gratings, Optics Letters, vol. 33, No. 24, Dec. 12, 2008, p. 3013-3015.

G. F. R. Chen et al., Second and third order dispersion generation using nonlinearly chirped silicon waveguide gratings, Optics Express, vol. 21, No. 24, Nov. 18, 2013, p. 29223-29230.

D. T. H. Tan et al., Monolithic nonlinear pulse compressor on a silicon chip, Nature Communications, 1, 116, Nov. 16, 2010.

W. Shi et al., Coupler-apodized Bragg-grating add-drop filter, Optics Letters, vol. 38, No. 16, Aug. 15, 2013, p. 3068-3070.

D. T. H. Tan, Optical pulse compression on a silicon chip—Effect of group velocity dispersion and free carriers, pplied Physics Letters, 101(21), 211112, Nov. 21, 2012.

A. Yariv et al., Optical Waves in Crystals: Propagation and Control of Laser Radiation, Wiley, 1984.

W. Shi et al., Ultra-compact, flat-top demultiplexer using anti-reflection contra-directional couplers for CWDM networks on silicon, Optics Express, vol. 21, No. 6, Mar. 13, 2013, p. 6733-6738.

\* cited by examiner

OPTICAL DEVICES AND METHODS FOR FABRICATING AN OPTICAL DEVICE

CROSS-REFERENCE TO RELATED APPLICATIONS

This application claims the benefit of U.S. provisional application No. 62/310,046 filed Mar. 18, 2016, the entire contents of which are incorporated herein by reference for all purposes.

TECHNICAL FIELD

Various embodiments relate to optical devices and methods for fabricating an optical device.

BACKGROUND

In communications and networking technologies, the data carrying capacity of a transmission medium may be increased using multiplexing. Multiplexing may be a method by which a plurality of signals is combined into one signal over a shared transmission medium. The plurality of signals may be distinguishable over each other by at least one of characteristics in time, wavelength, frequency, orbital angular momentum, polarization or mode. Examples of multiplexing techniques may include time division multiplexing (TDM), wavelength division multiplexing (WDM), frequency division multiplexing (FDM), orbital angular momentum multiplexing, polarization division multiplexing and modal divisional multiplexing (MDM). For example, optical pulses may be multiplexed by optical TDM, in which optical pulses are interleaved in time. In optical TDM, the data capacity scales inversely with the pulse width of the optical pulses.

SUMMARY

According to various embodiments, there may be provided an optical device, including a waveguide configured to propagate an electromagnetic wave, the waveguide including a first grating and a second grating; a first further waveguide including a first further grating, the first further waveguide having a first width, wherein the first further grating is coupled to the first grating to form a first pair of coupled gratings, wherein a grating period of the first further grating is at least substantially equal to a grating period of the first grating; a second further waveguide including a second further grating, the second further waveguide having a second width, wherein the second further grating is coupled to the second grating to form a second pair of coupled gratings, wherein a grating period of the second further grating is at least substantially equal to a grating period of the second grating.

According to various embodiments, there may be provided a method for fabricating an optical device, the method including providing a waveguide including a first grating and a second grating, the waveguide configured to propagate an electromagnetic wave; providing a first further waveguide including a first further grating, the first further waveguide having a first width; coupling the first further grating to the first grating to form a first pair of coupled gratings, wherein a grating period of the first further grating is at least substantially equal to a grating period of the first grating; providing a second further waveguide including a second further grating, the second further waveguide having a second width; coupling the second further grating to the second grating to form a second pair of coupled gratings, wherein a grating period of the second further grating is at least substantially equal to a grating period of the second grating.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

Figure 1:
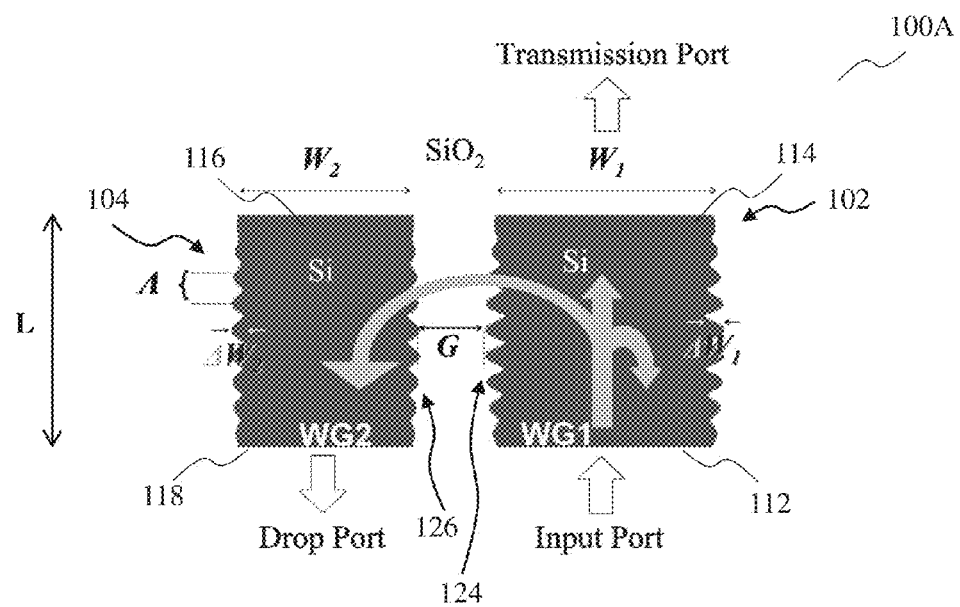
FIG. 1A shows a schematic diagram of an optical device according to various embodiments.
FIG. 1B shows a schematic diagram of an optical device according to various embodiments.

Embodiments described below in context of the devices are analogously valid for the respective methods, and vice versa. Furthermore, it will be understood that the embodiments described below may be combined, for example, a part of one embodiment may be combined with a part of another embodiment.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The term "coupled" (or "connected") herein may be understood as electrically coupled or as mechanically coupled, for example attached or fixed, or just in contact without any fixation, and it will be understood that both direct coupling or indirect coupling (in other words: coupling without direct contact) may be provided.

The reference to any conventional devices in this specification is not, and should not be taken as an acknowledgement or any form of suggestion that the referenced conventional devices form part of the common general knowledge in Australia (or any other country).

In order that the invention may be readily understood and put into practical effect, various embodiments will now be described by way of examples and not limitations, and with reference to the figures.

In the context of various embodiments, a "waveguide" is a structure that confines and directs wave propagation. The wave may be an electromagnetic wave at optical frequencies, i.e. a light wave.

In the context of various embodiments, the phrase "light wave" may be but is not limited to being interchangeably referred to as a "optical signal" or a "optical wave" or a "light signal".

In the context of various embodiments, "grating" may refer to an optical component having a periodic structure. The periodic structure may include periodic corrugations.

In the context of various embodiments, "grating period" may refer to a period of the periodic structure, or in other words, a period of the corrugations. The phrase "grating period" may be but is not limited to being interchangeably referred to as "corrugation period".

According to various embodiments, an optical device may be provided. The optical device may be configured to multiplex or demultiplex electromagnetic waves, to generate a multiplexed multi-channel signal. The electromagnetic waves may be in the visible frequency spectrum, in other words, may be optical waves. The electromagnetic waves may carry information, in other words, may be carrier signals. The optical device may multiplex a number of carrier signals into a single transmission medium, such as a waveguide. The optical device may be configured to simultaneously multiplex the electromagnetic waves by using both different wavelengths as well as different eigenmodes. In other words, the optical device may perform both wavelength division multiplexing (WDM) and mode division multiplexing (MDM) concurrently. In WDM, each carrier signal may have a different wavelength, such that each wavelength component of multiplexed signal may be an individual data channel or carrier signal. In MDM, each carrier signal may be of a different eigenmode order. Different eigenmodes co-propagating in a transmission medium may be orthogonal, in other words, they do not interact or coupled to one another. Each eigenmode propagates independently within the transmission medium and therefore, may be an individual data channel or carrier signal. With combined MDM and WDM, the optical device may increase the quantity of data channels that may be simultaneously carried by a transmission medium such as a waveguide. The quantity of data channels may be at least substantially equal to a quantity of different wavelengths multiplied by a quantity of different eigenmodes.

According to various embodiments, the optical device may include coupled gratings. The coupled gratings may provide Bragg coupling effect, in other words, may function as Bragg gratings. The coupled gratings may include periodic perturbations, for example, in the form of regularly-spaced corrugations. The periodic perturbations may be sinusoidally-shaped. The periodic perturbations may be formed on sidewalls of waveguides. The periodic perturbations of adjacent waveguides, that are facing each other, may form a coupled grating. The coupled grating may cross-couple counter-propagation modes in adjacent waveguides. In other words, the coupled grating may cause contradirectional coupling. The coupled grating may couple electromagnetic wave components having a coupling wavelength, from one waveguide to an adjacent waveguide, while passing other wavelength components through the waveguide without coupling them to the adjacent waveguide. The coupling wavelength may also be referred herein as the drop wavelength, or add wavelength, or add/drop wavelength. The coupled grating may provide wavelength selectivity through the periodicity of the corrugations. The periodicity required to achieve a wavelength of interest, may be determined based on Bragg conditions. The adjacent waveguides may include a single-mode waveguide and a multi-mode waveguide. The coupled grating may couple a wavelength of interest from the single-mode waveguide into the multi-mode waveguide. In addition, the coupled gratings may also be used for dispersion engineering and pulse compression.

According to various embodiments, the optical device may increase the data carrying capacity of a transmission medium by more than 100 times, for example 500 times more data than a non-multiplexed medium. The optical device may increase the data carrying capacity of a semiconductor chip, for example, to more than 1 Terabits per second.

According to various embodiments, the optical device may rely on distributed resonances to achieve both wavelength and mode selection. The optical device may include waveguides and a coupled grating. The coupled grating may include perturbations that may be periodic or quasi-periodic effective index perturbations, to achieve the distributed resonances. The perturbations may be structural variations on waveguides. The perturbations may also be dielectric structures arranged outside of, but close to the waveguides. In contrast to existing mode division multiplexing techniques that rely on localized optical resonances which may couple different optical modes and wavelengths to different extents, the extinction ratio of the optical device may be maximized through a long device length. The device length may refer to the distance over which coupling of electromagnetic waves occur, in other words, may depend on a length of the coupled grating. Therefore, the optical device may achieve a sufficiently large extinction ratio to operate in the low loss regime.

FIG. 1A shows a schematic diagram of an optical device 100A according to various embodiments. The optical device 100A may be fabricated on a semiconductor substrate, for example a silicon-on-insulator (SOI) wafer. The optical device 100A may include an input waveguide 102 and an output waveguide 104. Each waveguide may include a longitudinally extended core that is transversely surrounded by a cladding. The core may include a high-index optical medium whereas the cladding may include a low-index optical medium. Each waveguide may be configured to guide an optical wave to propagate along a longitudinal direction of the waveguide. The input waveguide 102 may be arranged adjacent to the output waveguide 104, with a small gap, G between them. The width of the input waveguide 102 is denoted as $W_1$ while the width of the output waveguide is denoted as $W_2$. The input waveguide 102 may include a first end 112 and a second end 114. A longitudinal axis of the input waveguide 102 may be defined as being parallel to a direction from the first end 112 to the second end 114. The input waveguide 102 may include an input grating 124 between the first end 112 and the second end 114. The output waveguide 104 may be similar to the input waveguide 102 in structure and composition, but may differ from the input waveguide 102 with respect to dimensions. The output waveguide 104 may also include a first end 116 and a second end 118. The longitudinal axis of the output waveguide 104 may be defined as being parallel to a direction from the first end 116 to the second end 118. The output waveguide 104 may also include an output grating 126 between the first end 116 and the second end 118. Each of the input grating 124 and the output grating 126 may include periodic perturbations. The periodic perturbations may be corrugations formed on side walls of the respective waveguides. The side wall of each waveguide may be at least substantially parallel to the longitudinal axis of the waveguide. The input grating 124 may face the output grating 126. The corrugations may be vertically formed, in other words, a length of each corrugation may be at least substantially perpendicular to the longitudinal axis of the respective waveguide. In other words, the periodic perturbations of each of the input grating 124 and the output grating 126 may be periodic along the longitudinal axis of the respective waveguide. The periodic perturbations may be at least substantially sinusoidal along the longitudinal axis of the waveguides. Alternatively, the periodic perturbations may be at least substantially rectangular in shape. A period of the input grating 124 may be at least substantially equal to the period of the output grating 126, and may be denoted as $\Lambda$. A modulation depth of the input waveguide may be denoted as $\Delta W_1$ while the modulation depth of the output waveguide 104 may be denoted as $\Delta W_2$. The modulation depth may refer to the extent to which the corrugations extend out from the side wall or the extent to which the corrugations are etched into the side wall. $\Delta W_1$ may be, but need not be, different from $\Delta W_2$. The input grating 124 and the output grating 126 may form a coupled grating that collectively functions as a Bragg grating. The first end 112 of the input waveguide 102 may serve as an input port for receiving an electromagnetic wave. The second end 114 of the input waveguide 104 may serve as a transmission port for at least partially outputting the received electromagnetic wave. As the electromagnetic wave passes through the input waveguide 102, a desired wavelength component may be coupled to the output waveguide 104 through the coupled grating. The desired wavelength component may have a wavelength that matches the drop wavelength, i.e. the wavelength at which the Bragg coupling condition is fulfilled. The input waveguide 102 may output all other wavelength components of the electromagnetic wave out through the transmission port. The desired wavelength component that is coupled to the output waveguide 104 may travel towards the second end 118 of the output waveguide 104. The second end 118 may serve as a drop port to 'drop' the desired wavelength component. The drop wavelength may depend on the grating period $\Lambda$, as well as the effective indices of the input grating 124 and the output grating 126. The bandwidth of the optical device 100A may be tailored by varying the gap G. A smaller value of G may result in a larger overlap integral of the counter-propagating fields of the corrugations, leading to a larger bandwidth. The corrugations may be modulated with an apodization filter to modulate the coupling coefficient from zero at the extreme ends of the gratings, to a maximum value at the centre of the gratings.

Figure 1B:
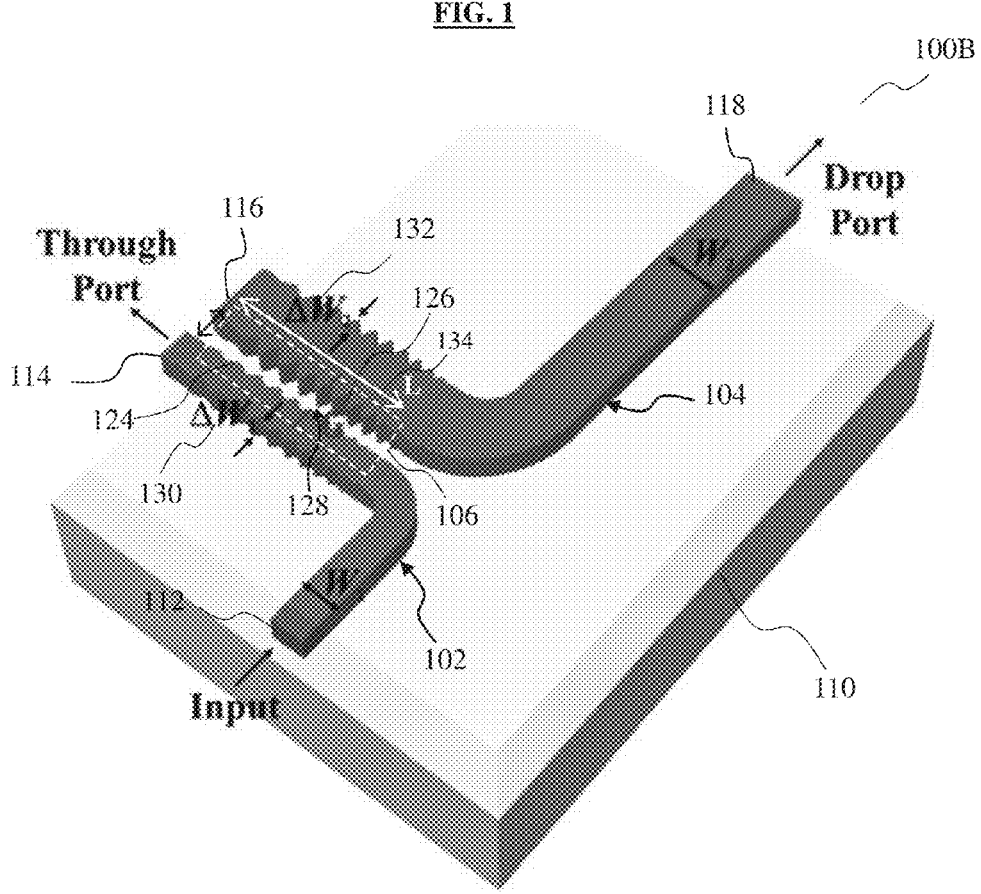

FIG. 1B shows a schematic diagram of an optical device 100B according to various embodiments. The optical device 100B may be a multiplexer. In other words, the optical device 100B may be configured to combine at least two optical channels into a single combined optical channel. The optical device 100B may be similar to, or identical to the optical device 100A. The optical device 100B may also include the input waveguide 102 and the output waveguide 104. The waveguides may be fabricated on a semiconductor chip, such as a silicon chip 110. The semiconductor chip may include at least one of gallium arsenide, silicon nitride, silicon rich nitride, doped silica, indium gallium arsenide phosphide, silicon nitride on silicon dioxide, silicon-rich nitride on silica, doped silica on silica, silicon on sapphire, or gallium arsenide on aluminum gallium arsenide. The input waveguide 102 may be a single-mode waveguide, in other words, may be configured to convey only a single mode of the optical wave. The output waveguide 104 may be a multi-mode waveguide. The output waveguide 104 may be configured to convey more than one mode of the optical wave. The output waveguide 104 may be wider than the input waveguide 102, i.e. $W_2$ may be larger than $W_1$. The input waveguide 102 may be optically coupled to the output waveguide 104 through the coupled grating 106. The coupled grating 106 may be a Bragg grating. The coupled grating 106 may include corrugations formed at least substantially perpendicular to a direction by which each of the input waveguide 102 and the output waveguide 104 convey optical waves. The corrugations may run at least perpendicular to a plane of the silicon chip 110. The corrugations may include ridges that extend from the side wall of the waveguides or ridges cut into the side wall of the waveguides. The corrugations may be cladding-based corrugation, in other words, formed on the cladding. The corrugations may be at least substantially equally spaced. The modulation depth 130 of the input grating 124 may be denoted as $\Delta W_1$. The modulation depth 132 of the output grating 126 may be denoted as $\Delta W_2$. $\Delta W_1$ and $\Delta W_2$ may be at least substantially identical. The input waveguide 102 and the output waveguide 104 may be spaced slightly apart, such that a gap exists between the input grating 124 and the output grating 126. The gap width 128, which may be a peak-to-peak distance between the input grating 124 and the output grating 126, may be denoted as G. The gap width 128 may be the minimal distance between the input grating 124 and the output grating 126. The bandwidth of each of the input waveguide 102 and the output waveguide 104 may depend on the gap width 128.

Figure 2:
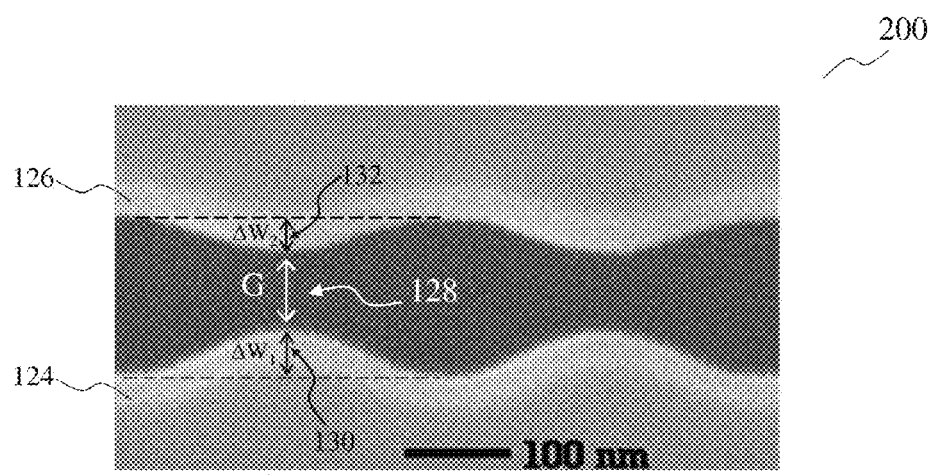
FIG. 2 shows a micrograph of a coupled grating of an optical device according to various embodiments.

FIG. 2 shows a scanning electron microscopy (SEM) micrograph 200 of an optical device according to various embodiments. The micrograph 200 shows a close-up top view of the coupled grating 106. The micrograph 200 shows the gap width 128 between the input grating 124 and the output grating 126. The micrograph 200 also shows the modulation depths 130 and 132. The modulation depths 130 and 132 may refer to the depth or thickness of each corrugation of the respective gratings. In other words, the modulation depth 130 may refer to the distance by which a corrugation of the input grating 124 extends from a vertical surface of the input waveguide 102. The vertical surface may be at least substantially perpendicular to the length of the input waveguide 102. The modulation depth 132 may refer to the distance by which a corrugation of the output grating 126 extends from a vertical surface of the output waveguide 104. The vertical surface may be at least substantially perpendicular to the length of the output waveguide 104.

According to various embodiments, the optical device 100B may function as a multiplexer. The first end 112 of the input waveguide 102 may serve as an input port to receive an electromagnetic wave, for example a single-mode optical wave. The single-mode optical wave may be in the fundamental mode. The input waveguide 102 may convey the received single-mode optical wave along a length of the input waveguide 102 to the input grating 124. The coupled grating 106 may couple, or in other words, multiplex the single-mode optical wave into the output waveguide 104. The output waveguide 104 may be a multi-mode waveguide, in other words, may be wide enough to accommodate multiple eigenmode orders. The coupling between the input waveguide 102 and the output waveguide 104 may be predominantly contra-directional. In other words, the optical wave multiplexed into the output waveguide 104 may travel in an opposite direction from the optical wave in the input waveguide 102. The output waveguide 104 may convey a multi-mode optical wave. The fundamental mode optical wave from the input waveguide 102 may be coupled to any mode in the multi-mode optical wave, i.e. replace any mode in the multi-mode optical wave. The coupled grating 106 may include an apodization filter configured to eliminate unwanted side lobes in the spectra of the optical wave.

According to various embodiments, the optical device 100B may also function as a demultiplexer. The output waveguide 104 may receive a multi-mode optical wave through the first end 116 and may guide the multi-mode optical wave to the output grating 126. The coupled grating 106 may demultiplex, in other words, couple one mode from the multi-mode optical wave, into the input waveguide 102.

According to various embodiments, the input waveguide 102 may be narrower in width as compared to the output waveguide 104. For example, $W_1$ may range from about 100 nm to about 1000 nm, for example from about 200 nm to about 600 nm, for example about 450 nm. The choice of $W_2$ may depend on the quantity of modes to be transmitted in the output waveguide 104. For example, $W_2$ may range from about 750 nm to about 2500 nm, for example about 1000 nm to about 2000 nm. $W_2$ may be about 1250 nm for the output waveguide 104 to support three optical modes. $W_2$ may be about 1850 nm for the output waveguide 104 to support five optical modes. The length of the coupled grating 106 may be denoted as device length 134, L. The device length 134 may range from about 100 μm to about 1000 μm, for example from about 250 μm to about 750 μm, for example about 500 μm. As an example, $\Delta W_1$ may range from about 25 nm to about 100 nm, for example from about 40 nm to about 60 nm, for example about 50 nm. $\Delta W_2$ may depend on $W_2$ and the material of the waveguide. As an example, $\Delta W_2$ may range from about $$\frac{W_2}{50}$$

to about $$\frac{W_2}{4}.$$

The gap width 128 may range from about 20 nm to about 150 nm, for example about 60 nm to about 120 nm, for example about 80 nm or about 100 nm. The coupling coefficient of the coupled grating 106 may depend on the gap width 128. When the gap width 128 is decreased, the overlap integral between the modes in the coupled grating 106 may increase, thereby increasing the coupling coefficient. The cross-coupling Bragg condition governing the drop wavelength may be given by:

$$\lambda_c = \Lambda \cdot (n_{\it{eff1}} + n_{\it{eff2,m}}) \qquad \text{(Equation 1)}$$

Or equivalently, $$\beta_1 + \beta_2 = \frac{2\pi}{\Lambda} \qquad \text{(Equation 2)}$$

where $n_{\it{eff1}}$ is the effective index of the mode in the input grating 124, $n_{\it{eff2,m}}$ is the effective index of the modes of the output grating 126, $\beta_1$ is the propagation constant of the input grating 124, $\beta_2$ is the propagation constant of the output grating 126, and $\Lambda$ is the grating period of the coupled grating 106.

In wavelength division multiplexing, $n_{\it{eff1}}$ and $n_{\it{eff2,m}}$ may refer to the effective indices of gratings at the fundamental modes, i.e. at m=0. In other words, $n_{\it{eff1}}$ may represent the effective index of the input waveguide 102's fundamental mode while $n_{\it{eff2,m}}$ may represent the effective index of the $m^{th}$ order of the output waveguide 104. The fundamental mode optical wave in the input waveguide 102 may be coupled to any mode in multi-mode optical wave in the output waveguide 104, when Equation (2) is satisfied. The modulation depth, also referred herein as the corrugation pitch, may be adjusted according to Equation (1) to select the mode of the optical wave that is to be dropped.

Figure 3:
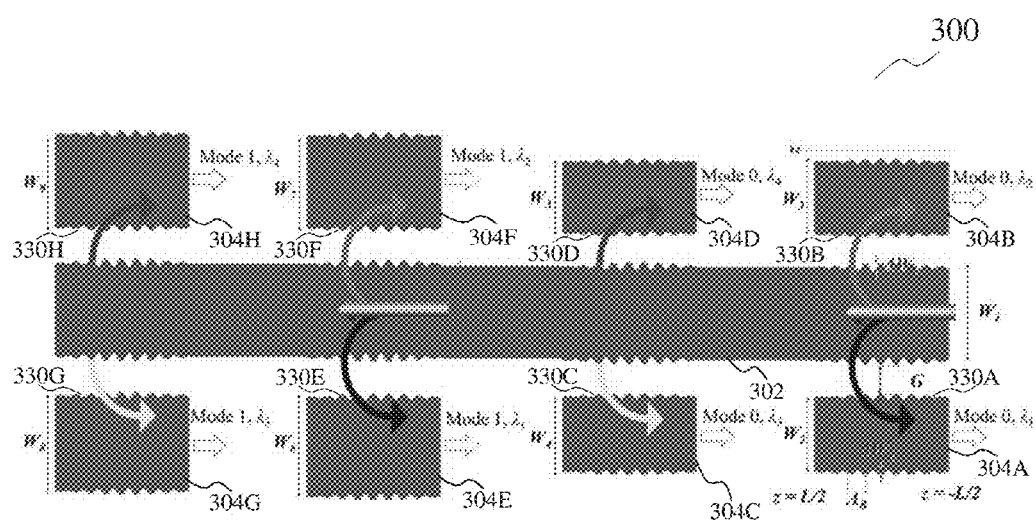
FIG. 3 shows a schematic diagram of an optical device according to various embodiments.

FIG. 3 shows a schematic diagram of an optical device 300 according to various embodiments. The optical device 300 may achieve simultaneous multiplexing in both mode division and wavelength division. The optical device 300 may include the optical device 100B. The optical device 300 may include a primary waveguide 302. The primary waveguide 302 may be identical, or similar to the input waveguide 102. The width of the primary waveguide 302 is denoted as $W_1$. The optical device 300 may further include a plurality of secondary waveguides 304A-304H. The secondary waveguides may be output waveguides, including at least one first output waveguide and a second output waveguide. While the schematic diagram shows eight secondary waveguides, it should be understood that the quantity of secondary waveguides may be any quantity more than one, and may be larger than eight. At least one of the secondary waveguides may be identical, or similar to the output waveguide 104. Each secondary waveguide may include a respective grating, referred herein as a secondary grating. Each secondary grating may include a plurality of corrugations. The corrugations may run at least substantially perpendicular to a longitudinal axis of the respective secondary waveguide. The corrugations may be shaped at least substantially sinusoidal or rectangular. The respective widths of the secondary waveguides are denoted as $W_2$ to $W_9$ respectively. The primary waveguide 302 may include a plurality of primary gratings 330A-330H. Each primary grating may include a plurality of corrugations. The corrugations may run at least substantially perpendicular to a length and a width of the respective primary waveguide. The corrugations may be shaped at least substantially sinusoidal or rectangular. Each primary grating may be aligned with the secondary grating of a respective secondary waveguide to form a respective pair of coupled grating. For example, the primary grating 330A may be aligned with the secondary grating of the secondary waveguide 304A, to form a first coupled grating. In each coupled grating, the primary grating and the secondary grating may have at least substantially equal modulation depth. Each pair of coupled grating may include an apodization filter. The filter function of the apodization filter may be one of raised cosine, cosine, Blackman, hyperbolic tangent, Connes, Gaussian, Hamming, Hanning or Welch. The primary waveguide 302 may receive an optical wave, for example a broadband light wave. The first coupled grating may be configured to couple a first optical wave into the secondary waveguide 304A. The first optical wave may include a wavelength $\lambda_1$ component of the received optical wave into the fundamental mode, i.e. mode order 0 of the optical transmission in the secondary waveguide 304A. The second coupled grating between the secondary grating of the secondary waveguide 304B and the primary waveguide grating 302B may be configured to couple a second optical wave into the secondary waveguide 304B. The second optical wave may include another wavelength ($\lambda_2$) component of the received optical wave into the fundamental mode, of the optical transmission in the secondary waveguide 304B. The grating period of the second coupled grating may be larger than the grating period of the first coupled grating. Consequently, the add/drop wavelength of the optical wave in the secondary waveguide 302B may be larger than the optical wave in the secondary waveguide 302B. In other words, $\lambda_2$ may be larger than $\lambda_1$. Similarly, the coupled grating between the secondary waveguide 304C and the primary waveguide 302, as well as the coupled grating between the secondary waveguide 304D and the primary waveguide 302, may also be configured to couple other wavelength components of the optical wave into the fundamental mode of the optical transmission in the respective secondary waveguides. The coupled grating between the secondary waveguide 304E and the primary waveguide 302 may also be configured to couple the wavelength $\lambda_1$ component of the optical wave into the secondary waveguide 304E, into the first order mode, i.e. m=1 of the optical transmission in the secondary waveguide 304E. Similarly, the coupled grating between the secondary waveguide 304F and the primary waveguide 302, the coupled grating between the secondary waveguide 304G and the primary waveguide 302, as well as the coupled grating between the secondary waveguide 304H and the primary waveguide 302, may each be configured to couple other wavelength components of the optical wave into the first order mode of the optical transmission in the respective secondary waveguides. The plurality of coupled gratings may have different grating periods. For example, the fifth coupled grating between the primary grating 330E and the secondary grating of secondary waveguide 304E may have a larger grating period than the first coupled grating. The mode order of the optical wave coupled into the secondary waveguide 304E may be higher than the mode order of the optical wave coupled into the secondary waveguide 304A. The add/drop wavelength in each secondary waveguide may be dependent on each of the grating period of the respective coupled grating, the width of the secondary waveguide and the mode order of the coupled optical wave. Even though wavelength component in secondary waveguide 304A may be the same as that in secondary waveguide 304E, the optical transmissions in these secondary waveguides may be separate data channels, as the optical transmissions are in different modes. Also, although each of secondary waveguides 304A-304D may be transmitting optical waves in the fundamental mode, each of these optical transmissions is also a separate data channel, as their optical transmissions have different wavelengths. Therefore, by combining both wavelength division multiplexing and mode division multiplexing, the optical device 300 may boost the quantity of independent data channels in a transmission medium.

According to various embodiments, the optical device 300 may function as a multiplexer, as well as a demultiplexer. The secondary waveguides 304A-304H may be configured to carry optical waves in their respective modes and wavelengths, and the coupled gratings may be configured to couple the respective optical waves into the primary waveguide 302. The primary waveguide 302 may be an output waveguide. The secondary waveguides 304A-304H may be input waveguides including at least a first input waveguide and a second input waveguide.

Figure 4:
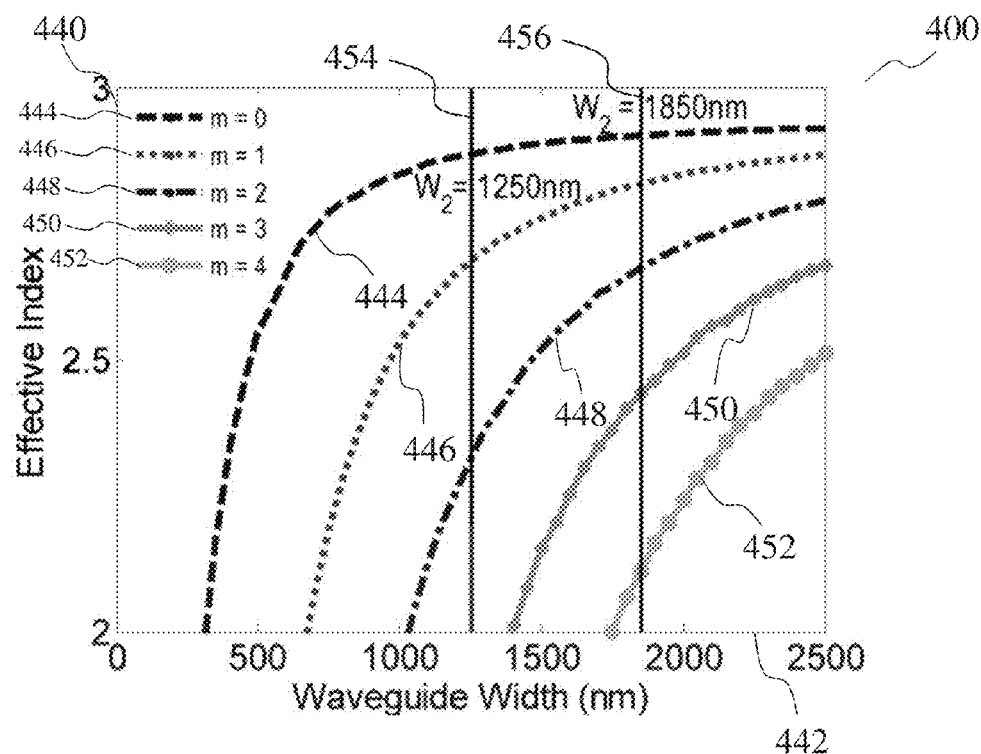
FIG. 4 shows a graph that shows the effective index of a waveguide according to various embodiments, as a function of the waveguide width

FIG. 4 shows a graph 400 that shows the effective index of a waveguide according to various embodiments, as a function of the waveguide width. The graph 400 includes a vertical axis 440 indicating the effective index, $n_{eff}$, as well as a horizontal axis 442 indicating the waveguide width in nanometers. The waveguide may be, for example, the output waveguide 104. The graph 400 further includes five plots to represent the mode orders m=0 to m=4. The first plot 444 represents the $n_{eff}$ function in the zeroth mode order, the second plot 446 represents the $n_{eff}$ function in the first mode order, the third plot 448 represents the $n_{eff}$ function in the second mode order, the fourth plot 450 represents the $n_{eff}$ function in the third mode order while the fifth plot 452 represents the $n_{eff}$ function in the fourth mode order. A first vertical line 454 indicates a waveguide width of 1250 nm. A second vertical line 456 indicates a waveguide width of 1850 nm. The graph 400 shows that the first plot 444, the second plot 446 and the third plot 448 exist within the space between zero waveguide width and the first vertical line 454. In other words, a waveguide having a width of 1250 nm may be able to carry mode orders m=0 to m=2. The graph 400 also shows that all of the five plots 444, 446, 448, 450 and 452 exist within the space between zero waveguide width and the second vertical line 456. In other words, a waveguide having a width of 1850 nm may be able to carry mode orders m=0 to m=4.

Figure 5:
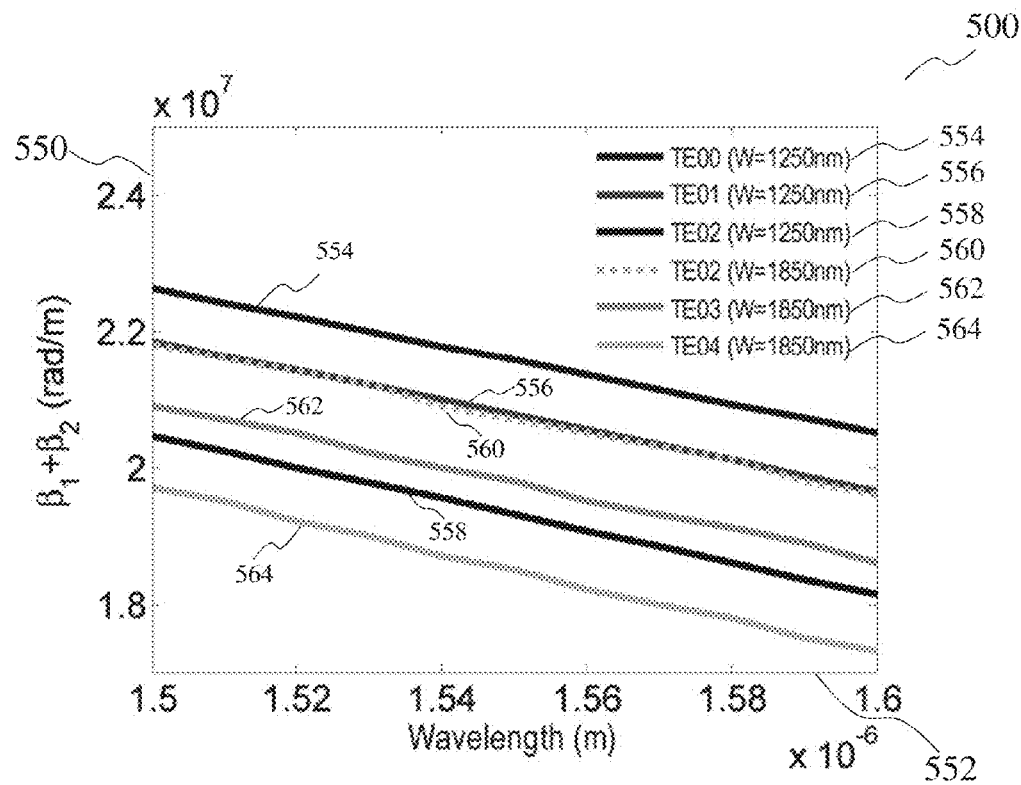
FIG. 5 shows a graph that shows the sum of propagation constants of the single-mode waveguide and the multi-mode waveguide as a function of a wavelength of the optical transmission.

FIG. 5 shows a graph 500 that shows the sum of propagation constants of the single-mode waveguide and the multi-mode waveguide, i.e. $\beta_1+\beta_2$ as a function of a wavelength of the optical transmission. The optical transmission may include optical waves travelling in transverse electric (TE) modes. The graph includes a vertical axis 550 indicating $\beta_1+\beta_2$ in rad/m, and a horizontal axis 552 indicating wavelength in meters. The graph 500 further includes six plots for various mode orders and waveguide widths. The first plot 554 represents the function of $\beta_1+\beta_2$ for mode order 0 in a waveguide that is 1250 nm wide. The second plot 556 represents the function of $\beta_1+\beta_2$ for mode order 1 in the same waveguide that is 1250 nm wide. The third plot 558 represents the function of $\beta_1+\beta_2$ for mode order 2 in the same waveguide that is 1250 nm wide. The fourth plot 560 represents the function of $\beta_1+\beta_2$ for mode order 2 in a waveguide that is 1850 nm wide. The fifth plot 562 represents the function of $\beta_1+\beta_2$ for mode order 3 in the waveguide that is 1850 nm wide. The sixth plot 564 represents the function of $\beta_1+\beta_2$ for mode order 4 in the waveguide that is 1850 nm wide. The first plot 554, the second plot 556 and the third plot 558 shows that for the same waveguide width of 1250 nm, $\beta_1+\beta_2$ decreases as the mode order increases. Similarly, the fourth plot 560, the fifth plot 562 and the sixth plot 564 shows that for the same waveguide width of 1850 nm, $\beta_1+\beta_2$ decreases as the mode order increases. Therefore, according to Equations (1) and (2), a larger grating period Λ may be required to fulfill the same drop wavelength, as the mode order increases.

Figure 6A:
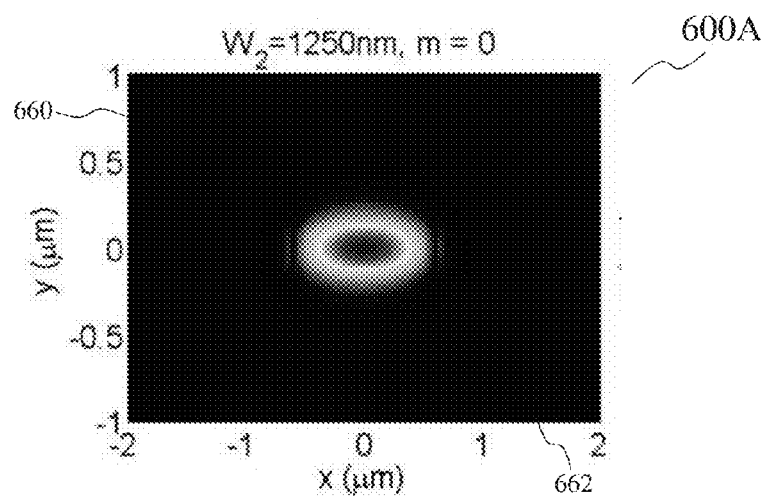
FIGS. 6A to 6C show mode profile diagrams of a multi-mode waveguide according to various embodiments.
Figure 6B:
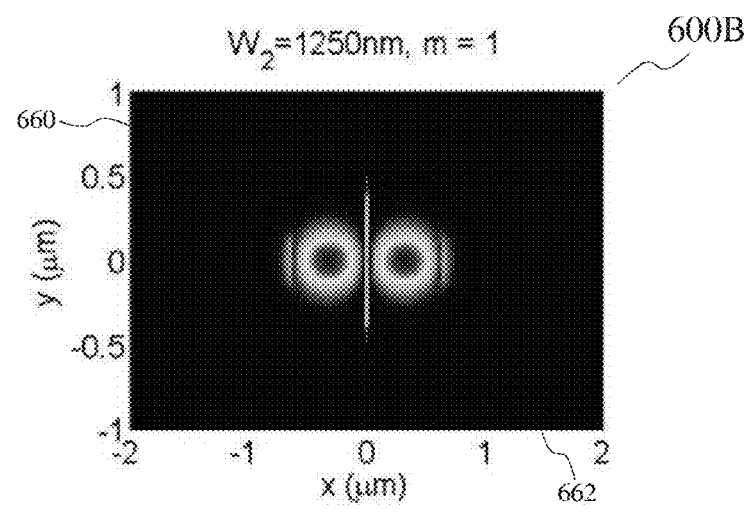
Figure 6C:
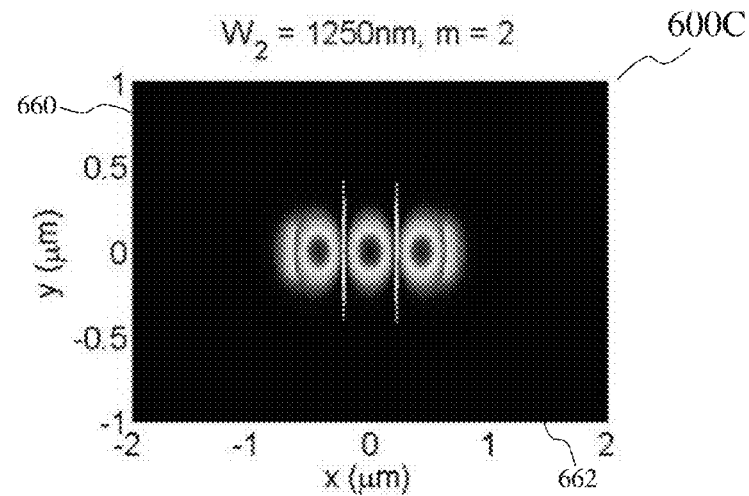

FIGS. 6A to 6C show mode profile diagrams 600A-600C of a multi-mode waveguide according to various embodiments. The width of the multi-mode waveguide is 1250 nm. The modes were calculated using a fully vectorial beam propagation method. The mode profile diagrams show the cross-sectional view of the optical transmission in the multi-mode waveguide. Each mode profile diagram includes a vertical axis 660 indicating a direction along the waveguide height and a horizontal axis 662 indicating a direction along the waveguide width. The mode profile diagram 600A shows the fundamental mode, i.e. m=0 of the optical wave in the multi-mode waveguide. The mode profile diagram 600B shows the first order mode, i.e. m=1 of the optical wave in the multi-mode waveguide. The mode profile diagram 600C shows the second order mode, i.e. m=2 of the optical wave in the multi-mode waveguide.

Figures 7A, 7B, 7C:
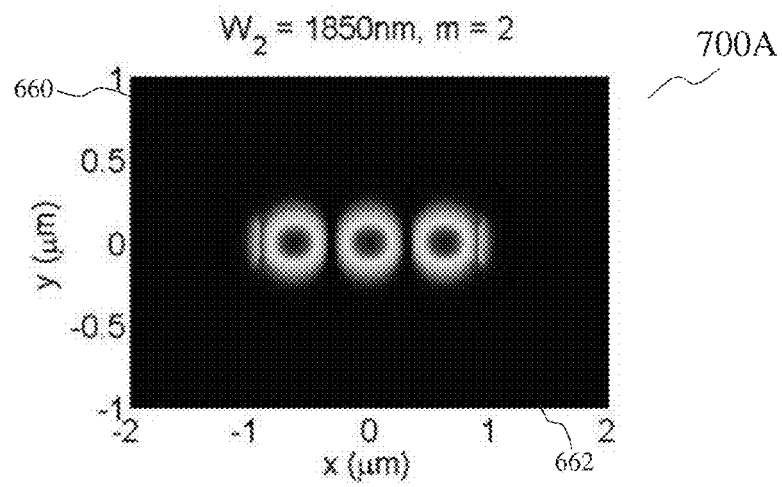
FIGS. 7A to 7C show mode profile diagrams of a multi-mode waveguide according to various embodiments.

FIGS. 7A to 7C show mode profile diagrams 700A-700C of a multi-mode waveguide according to various embodiments. The width of the multi-mode waveguide is 1850 nm. Similar to FIGS. 6A to 6C, the modes were calculated using a fully vectorial beam propagation method. The mode profile diagram 700A shows the second mode order, i.e. m=2 of the optical wave in the multi-mode waveguide. The mode profile diagram 700B shows the third mode order, i.e. m=3 of the optical wave in the multi-mode waveguide. The mode profile diagram 700C shows the fourth mode order, i.e. m=4 of the optical wave in the multi-mode waveguide.

According to various embodiments, the optical device may be fabricated using at least one of electron-beam lithography, reactive ion etching and plasma enhanced chemical vapor deposition. Plasma enhanced chemical vapor deposition may be used to provide an overcladding layer. The overcladding layer may include an insulator, such as silicon dioxide.

Prototype devices were fabricated to demonstrate the mode division multiplexing performance of an optical device according to various embodiments. The waveguides may possess a self-Bragg coupling effect which may result in a broad stop band located at $\lambda_{self}=2\cdot\Lambda\cdot n_{eff1,2}$. Operationally, the self-Bragg coupling effect from the multi-mode waveguide may show up within the C-band. Therefore, the self-Bragg coupling effect should be considered in the selection of the optical device parameters.

Figure 8A:
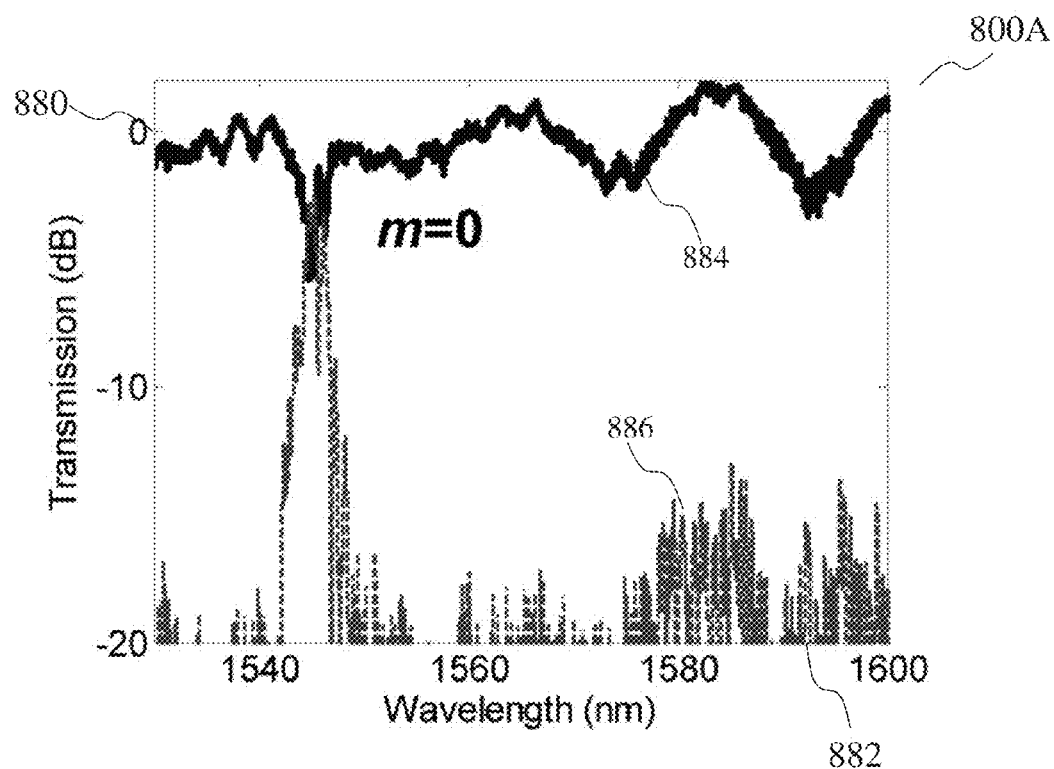
FIGS. 8A to 8C show the measured transmission spectrum of a first prototype device.
Figure 8B:
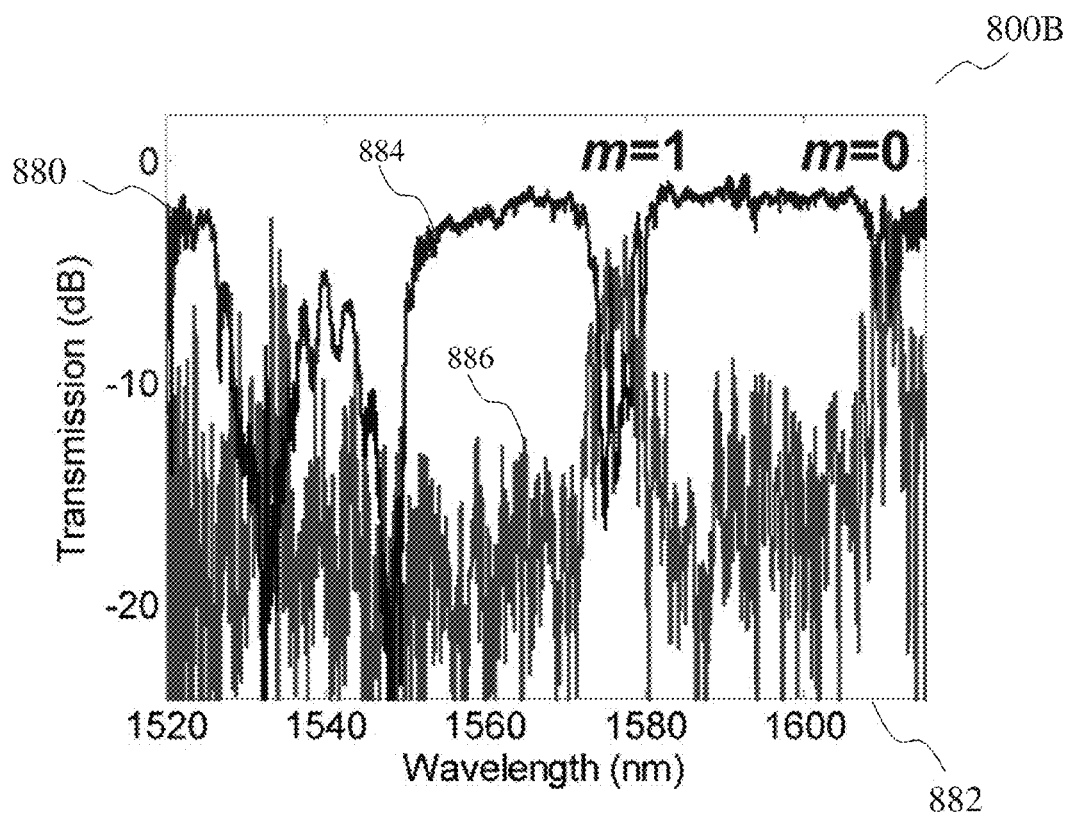
Figure 8C:
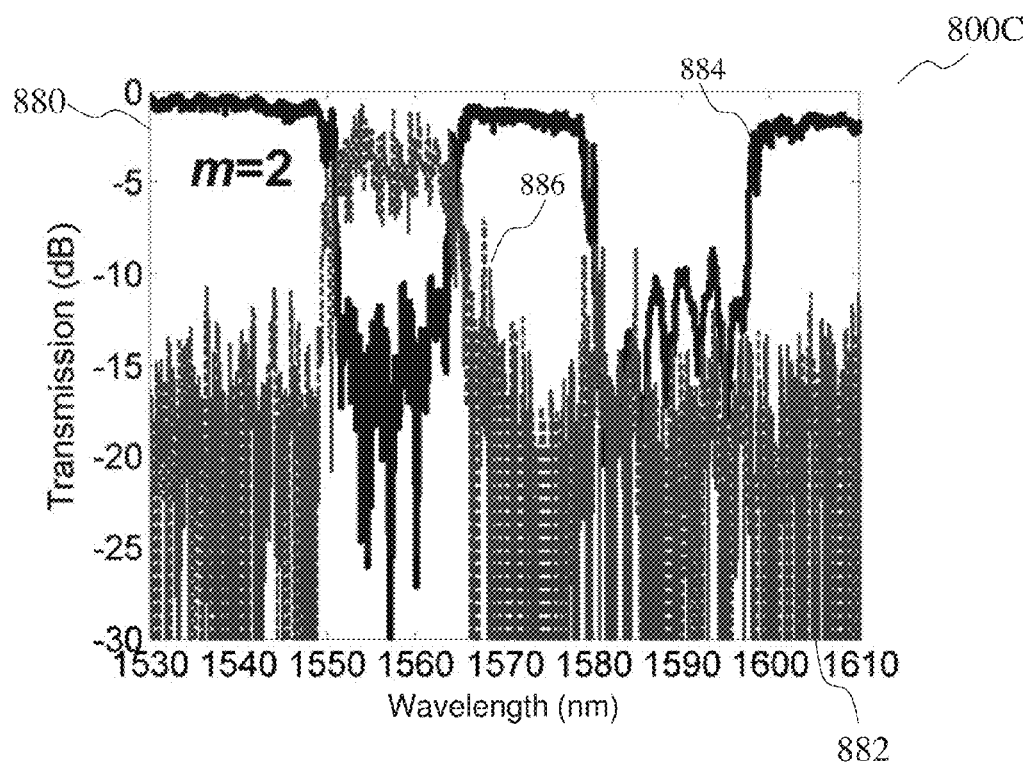

FIGS. 8A to 8C show the measured transmission spectrum of a first prototype device. The first prototype device includes a single-mode waveguide and a multi-mode waveguide. The single-mode waveguide may be similar to the input waveguide 102 or 302. The width of the single-mode waveguide was 450 nm. The multi-mode waveguide may be similar to the output waveguide 104 or any of the multi-mode waveguides 304A-304H. The width of the multi-mode waveguide was 1250 nm to support three optical modes. The gap width, G, i.e. the peak-to-peak distance between the grating of the single-mode waveguide and the grating of the multi-mode waveguide, was 80 nm. The first prototype device included three coupled gratings. The first coupled grating had a grating period of 290 nm, the second coupled grating had a period of 300 nm and the third coupled grating had a grating period of 330 nm. The first prototype device may be capable of multiplexing the zeroth, first and second order modes. The waveguides are apodized to minimize out of band ripple.

FIG. 8A shows a graph 800A that shows the transmission spectrum of the first prototype device, as a function of wavelength, in the zeroth order mode and using the first coupled grating. In other words, the grating period, Λ was 290 nm. The graph 800A includes a vertical axis 880 indicating the transmission in decibels, and a horizontal axis 882 indicating wavelength in nanometers. The graph 800A includes a first plot 884 representing the transmission spectrum and a second plot 886 representing the drop port spectrum. The graph 800A shows that the zeroth order drop port is centered at about 1545 nm.

FIG. 8B shows a graph 800B that shows the transmission spectrum of the first prototype device, as a function of wavelength, in the first order mode and using the second coupled grating. In other words, the grating period, Λ was 300 nm. The graph 800B includes a first plot 884 representing the transmission spectrum and a second plot 886 representing the drop port spectrum. The graph 800B shows that the broad stop band centered at about 1540 nm, corresponding to the self-Bragg coupling of the fundamental mode in the multimode waveguide. The drop port of the first order mode is centered at 1575 nm, while the drop port of the zeroth order mode is centered at about 1610 nm.

FIG. 8C shows a graph 800C that shows the transmission spectrum of the first prototype device, as a function of wavelength, in the second order mode and using the third coupled grating. In other words, the grating period, Λ was 330 nm. The graph 800C includes a first plot 884 representing the transmission spectrum and a second plot 886 representing the drop port spectrum. The graph 800C shows that the drop port of the third order mode is centered at around 1555 nm.

Figure 9:
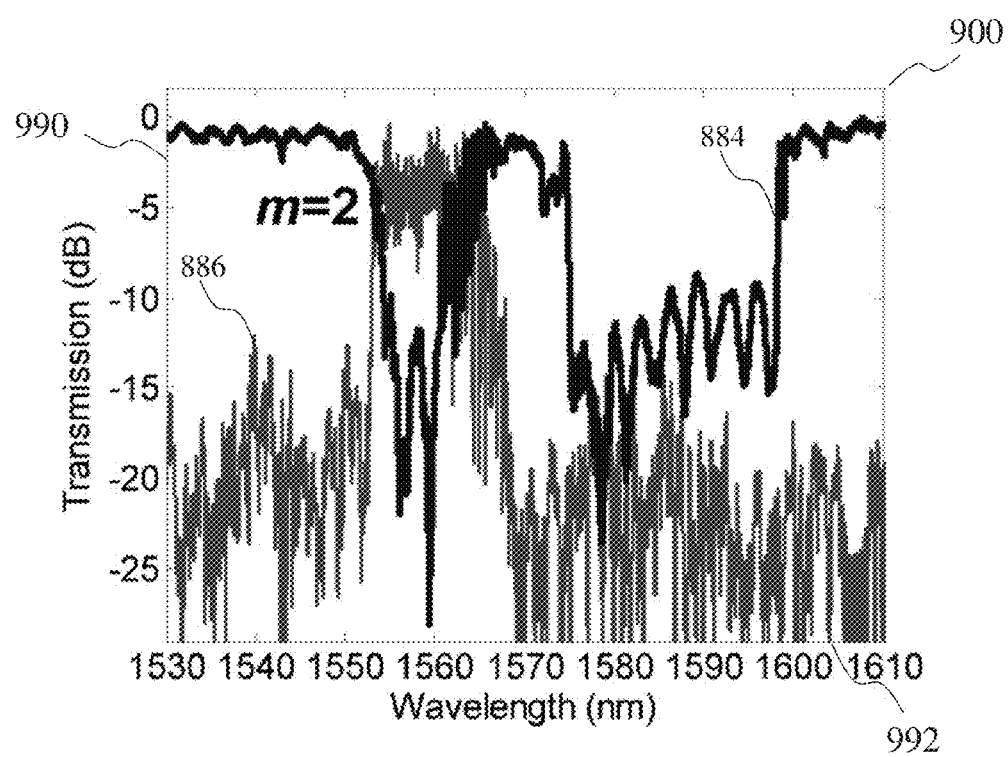
FIG. 9 shows a graph that shows the measured transmission spectrum of a second prototype device.

FIG. 9 shows a graph 900 that shows the measured transmission spectrum of a second prototype device as a function of wavelength, in the second order mode and using a coupled grating with grating period Λ of 335 nm. The second prototype device is similar to the first prototype device in that the single-mode waveguide width is 450 nm and the multi-mode waveguide width is 1250 nm. However, the gap width in the second prototype device is 100 nm instead of 80 nm. The graph 900 shows that the channel bandwidth of the second prototype device is smaller than the channel bandwidth of the first prototype device where the gap width is 80 nm. The graph 900 also shows that the drop port for the second order mode is centered at about 1550 nm, and the self-Bragg coupling from the fundamental mode is centered at about 1590 nm.

Figure 10A:
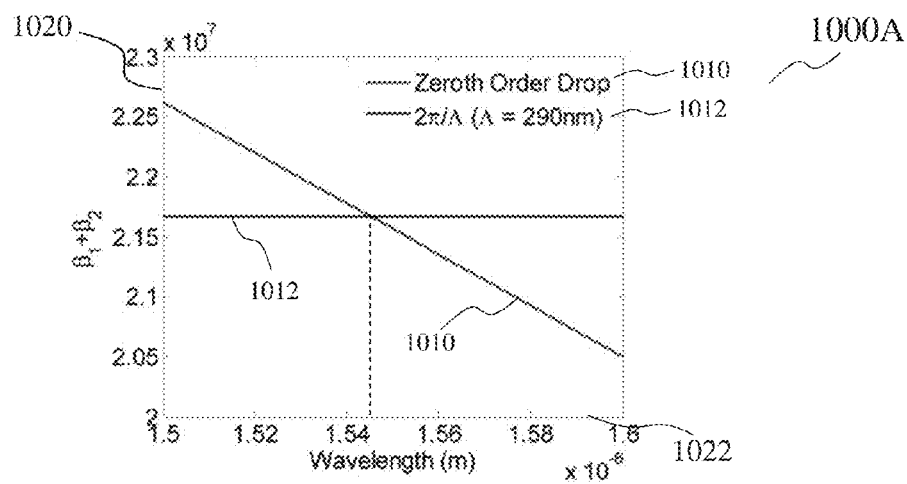
FIGS. 10A to 10C show the computed sum of propagation constants as a function of wavelength, corresponding to various mode orders.
Figure 10B:
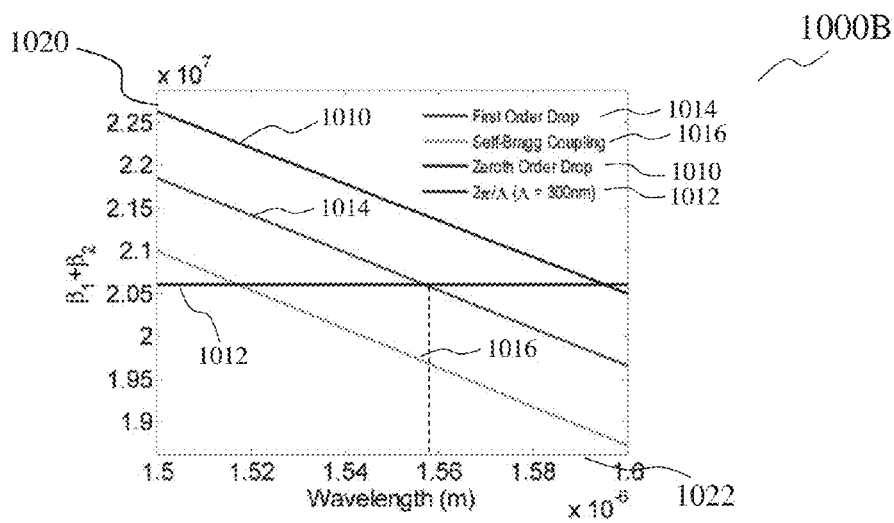
Figure 10C:
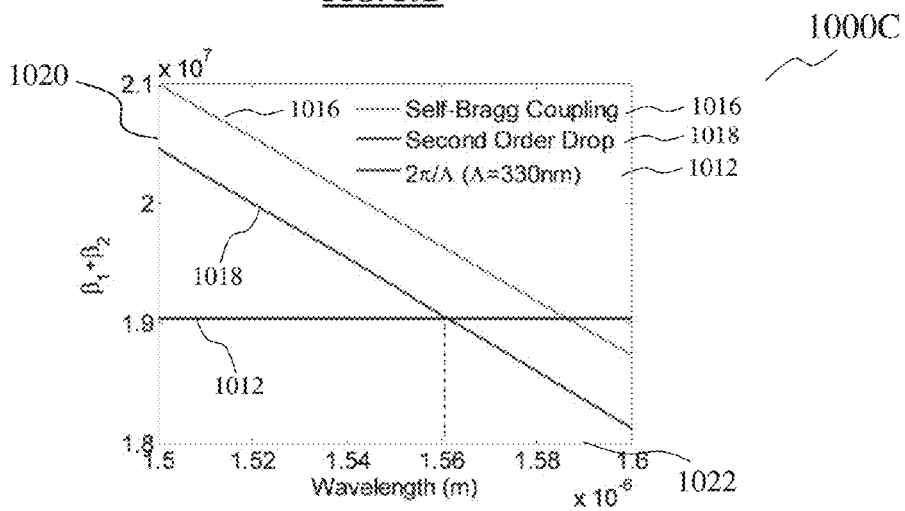

FIGS. 10A to 10C show the computed sum of propagation constants, i.e. $\beta_1+\beta_2$, as a function of wavelength, corresponding to various mode orders. Each graph of FIGS. 10A to 10C includes a vertical axis 1020 indicating $\beta_1+\beta_2$, and a horizontal axis 1022 indicating wavelength in meters.

FIG. 10A shows a graph 1000A that shows $\beta_1+\beta_2$ as a function of wavelength, for the zeroth order mode. The first plot 1010 represents the value of $\beta_1+\beta_2$ for the zeroth order mode drop wavelength. The horizontal line 1012 indicates the value of $$\frac{2\pi}{\Lambda}$$

where $\Lambda$ 290 nm. The intersection point of $$\beta_1 + \beta_2 \text{ and } \frac{2\pi}{\Lambda}$$

represents the wavelength at which the Bragg condition (Equation 2) is satisfied. In other words, the intersection point shows the Bragg wavelength for the particular mode order. The intersection point of the first plot 1010 and the horizontal line 1012 occurs at wavelength of about 1545 nm. In order words, the Bragg wavelength for the zeroth order mode is about 1545 nm.

FIG. 10B shows a graph 1000B that shows $\beta_1+\beta_2$ as a function of wavelength, for the zeroth order mode and the first order mode. The first plot 1010 represents the value of $\beta_1+\beta_2$ for the zeroth order mode drop wavelength. The horizontal line 1012 indicates the value of $$\frac{2\pi}{\Lambda}$$

where $\Lambda$ is 300 nm. The third plot 1014 represents the value of $\beta_1+\beta_2$ for the first order mode drop wavelength. The fourth plot 1016 represents self-Bragg coupling. The graph 1000B shows that the Bragg wavelength for the first order mode is about 1555 nm.

FIG. 10C shows a graph 1000C that shows $\beta_1+\beta_2$ as a function of wavelength, for the second order mode. The horizontal line 1012 indicates the value of $$\frac{2\pi}{\Lambda}$$

where $\Lambda$ is 330 nm. The fourth plot 1016 represents the self-Bragg coupling. The fifth plot 1018 represents the value of $\beta_1+\beta_2$ for the second order mode drop wavelength. The intersection point of the fifth plot 1018 and the horizontal line 1012 occurs at wavelength of about 1.56 um.

The experiment demonstrated that the optical device is capable of multiplexing the zeroth to second order modes. The graphs 1000A, 1000B and 1000C show good agreement between the expected and measured mode division multiplexing wavelengths as compared to the graphs 800A, 800B and 800C, although the self-Bragg coupling and the first order drop wavelength are slightly red-shifted from their expected locations. This effect may be caused by the slightly wider width of the single-mode waveguide because the shift is observed in all three spectral features of interest. The width of the single-mode waveguide in the prototype devices is about 480 nm instead of the designed 450 nm due to fabrication tolerances. The Bragg conditions governing the cross coupling wavelength, $\lambda_c=\Lambda\cdot(n_{eff1}+n_{eff2,m})$ and the self Bragg coupling wavelength, $\lambda_{self}=2\cdot\Lambda\cdot n_{eff1}$ may imply that a larger $n_{eff1}$ arising from a wider single-mode waveguide width may cause an increase in $\lambda_c$ as well as $\lambda_{self}$. A change in the grating period may only cause a change in $\lambda_c$ for the zeroth and first order modes, but may not cause a corresponding red shift in $\lambda_{self}$. Similarly, a slightly wider width of the multi-mode waveguide may only cause a red shift in $\lambda_c$ for the zeroth and first order modes, but may not cause a corresponding red shift in $\lambda_{self}$ because there is no dependence of $\lambda_{self}$ on $n_{eff2,m}$. In addition, typical insertion losses of the device loss less coupling losses may be about 1-2 dB.

Based on the extinction and bandwidth of each of the drop ports, the cross-coupling bandwidth is observed to increase from 2 nm to 7 nm and 15 nm as the mode order increases from zero to two. This phenomenon may be a result of the larger cross coupling strength as the mode order is increased. Higher mode orders have larger mode sizes, and extend further into the cladding, as is also evidenced by their smaller effective indices. The calculated 1/e widths of the modes are 0.97 μm, 1.31 μm and 1.45 μm for m=0, 1 and 2 respectively, confirming the increasing field width as the mode order increases. This may lead to a stronger interaction with the periodic perturbations on the waveguide sidewalls. In addition, the stronger cross coupling may be manifested by stronger extinction ratios as the mode order increases. For the same device length, the extinction ratio may be observed to increase from 5 dB to 15 dB and more than 20 dB as the mode order increases from zero to two.

The amount of data that may be accommodated in each data channel in a transmission medium may be varied by tailoring the data channel bandwidth. The bandwidth of each multiplexed channel may be varied by adjusting the gap width, G between the coupled gratings. For example, the graph 900 shows that the 3 dB bandwidth of the channel decreased from 4 nm to 3 nm when the gap with is increased from 80 nm to 100 nm. The gap width may be adjusted to ensure that all multiplexed channels have the same channel bandwidth regardless of the mode order The weak extinction observed for m=0 may be improved by adjusting the device length. Since the extinction ratio is a function of both the cross-coupling strength, $\kappa_c$ and the device length L, according to the formula, $R=\tan h^2(\kappa_c L)$, a longer device length may lead to better extinction.

In addition, placement of the multiplexed channels may be performed by varying the pitch of the coupled gratings. The graphs 800A and 800B show that the zeroth order multiplexed mode may be shifted from 1545 nm to 1610 nm by increasing the pitch from 290 nm to 300 nm. In this way, operation at desired wavelengths may be designed to combine both wavelength division and mode division multiplexing.

The augmentation in the amount of data capacity in a transmission medium may be directly related to the number of modes supported by the waveguide. In order to further demonstrate the optical device's ability to multiplex higher order modes, a third prototype device is fabricated and tested.

Figure 11A:
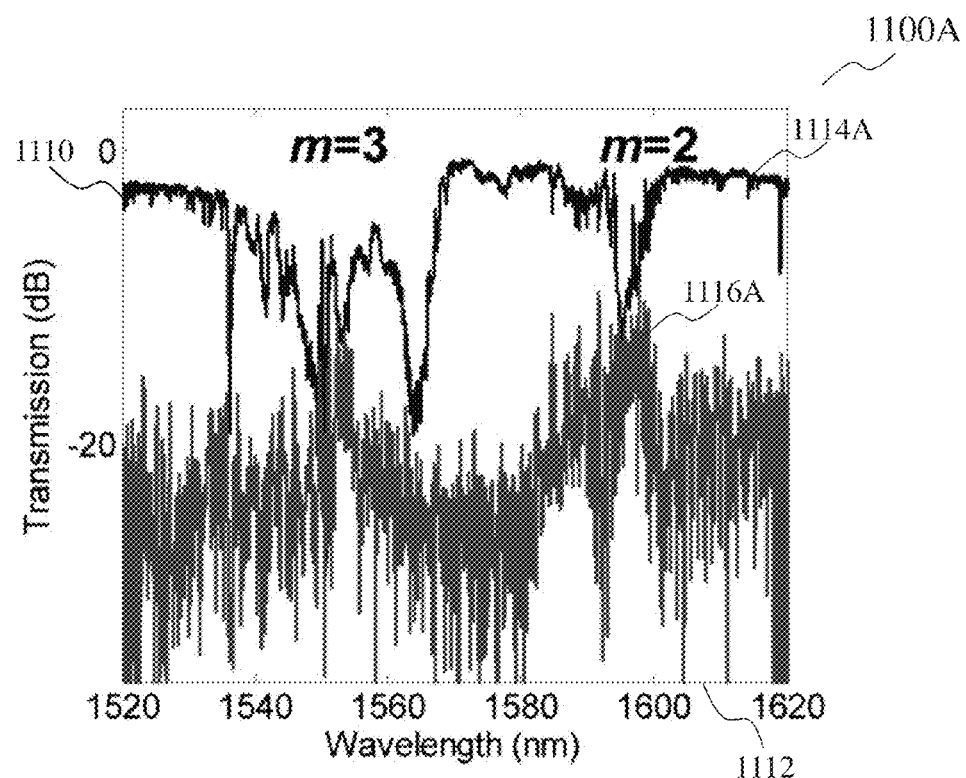
FIGS. 11A and 11B show the measured transmission spectrum of the third prototype device.
Figure 11B:
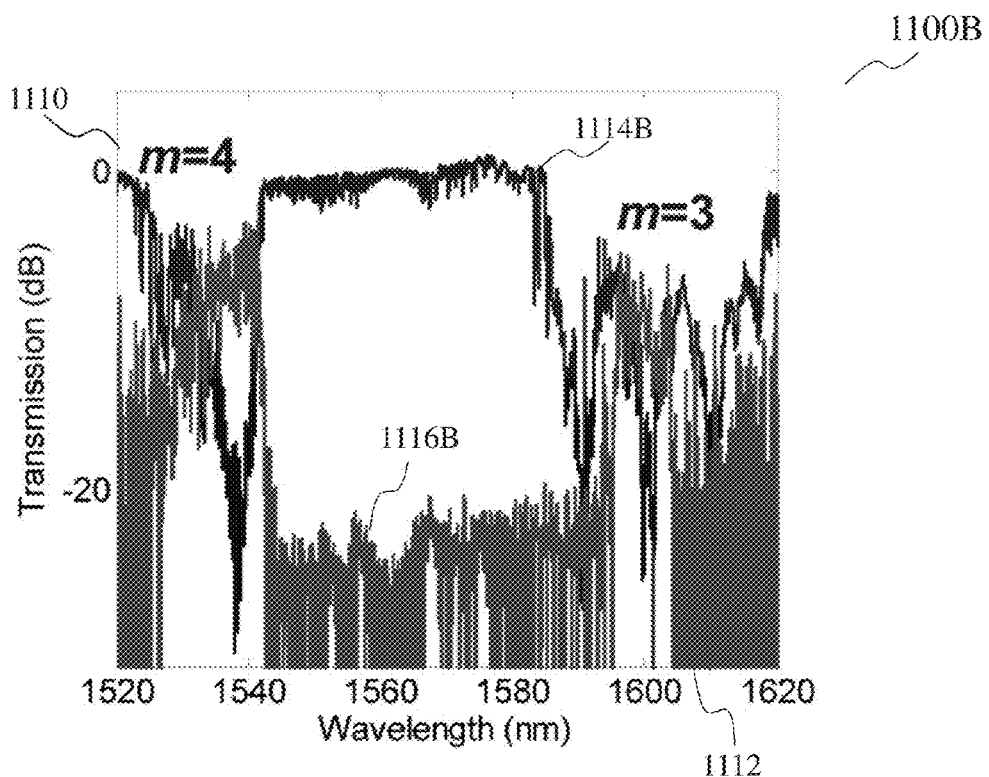

FIGS. 11A and 11B show the measured transmission spectrum of the third prototype device. The third prototype device includes a single-mode waveguide and a multi-mode waveguide. The single-mode waveguide may be similar to the input waveguide 102 or 302. The multi-mode waveguide may be similar to the output waveguide 104 or any of the multi-mode waveguides 304A-304H. The width of the single-mode waveguide is 450 nm. The width of the multi-mode waveguide is 1850 nm to support five optical modes. The gap width, G is 100 nm. The third prototype device also includes three coupled gratings, similarly to the first prototype device. The third prototype device includes two coupled gratings. The first coupled grating had a grating period of 315 nm and the second coupled grating had a period of 340 nm. The grating periods were selected to multiplex the second, third and fourth order modes close to the 1.55 µm wavelength according to Equation (1). The waveguides are apodized to minimize out of band ripple.

FIG. 11A shows a graph 1100A that shows the transmission spectrum of the third prototype device, as a function of wavelength, in the second and third order modes and using the first coupled grating. The grating period, Λ is 315 nm. The graph 1100A includes a vertical axis 1110 indicating the transmission in decibels, and a horizontal axis 1112 indicating wavelength in nanometers. The graph 1100A includes a first plot 1114A representing the transmission spectrum, and a second plot 1116A representing the drop port spectrum. The transmission spectrum and the drop port spectrum show the multiplexing of the second and third order modes. Two higher order modes are observed to be dropped from the device. The second order mode for the multi-mode waveguide is dropped at close to 1600 nm. The third order mode is dropped at close to 1550 nm. The effective index of the third order mode is about 2.43 at 1550 nm, which is very close to that of the fundamental mode for the single-mode waveguide. Consequently, the two resonances overlap at a wavelength of around 1550 nm. Even though the coupling strength is expected to be larger as the mode order increases, the amount of power dropped in the third order mode is smaller than in the second order mode because of the co-location of the self-Bragg coupling when $W_1$=450 nm and the cross-coupling for the third order mode.

FIG. 11B shows a graph 1100B that shows the transmission spectrum of the third prototype device, as a function of wavelength, in the third and fourth order modes and using the second coupled grating. The grating period, Λ is 340 nm. The graph 1100A includes a first plot 1114B representing the transmission spectrum, and a second plot 1116B representing the drop port spectrum. The cross-coupling for the third order mode is now shifted to 1600 nm, along with the self-Bragg coupling of the waveguide with $W_1$=450 nm. The fourth order drop is now observed at 1540 nm.

Figure 12A:
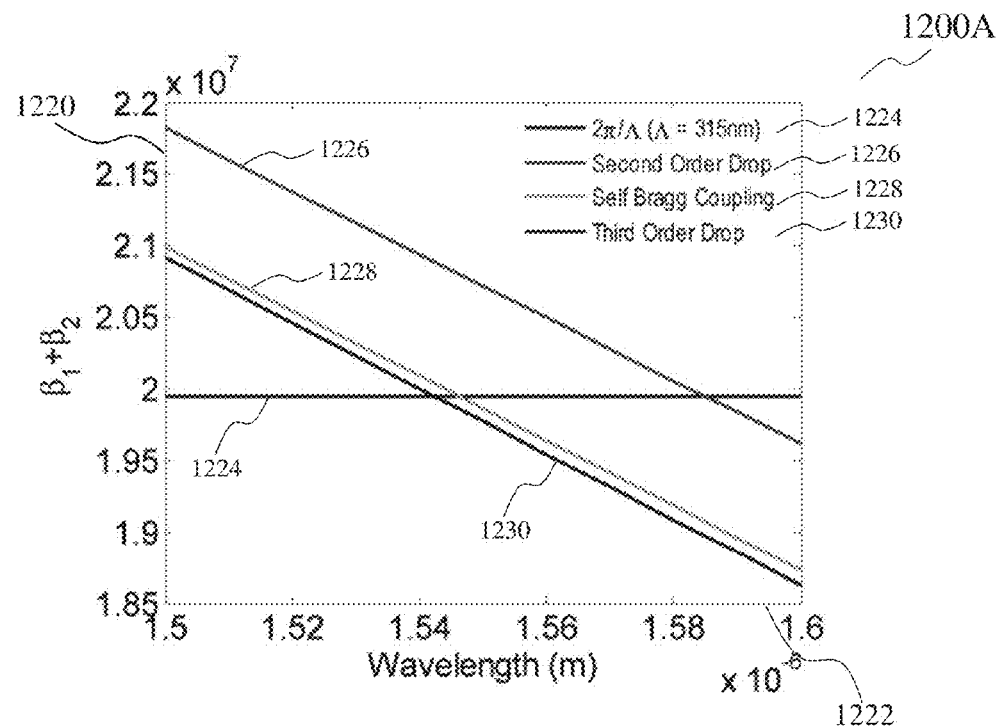
FIG. 12A shows a graph that shows the computed sum of propagation constants as a function of wavelength corresponding to the second and third order modes.

FIG. 12A shows a graph 1200A that shows the computed sum of propagation constants as a function of wavelength corresponding to the second and third order modes. The graph 1200A includes a vertical axis 1220 indicating the sum of propagation constants, and a horizontal axis indicating wavelength in meters. The graph 1200A further includes a first plot 1224 representing $$\frac{2\pi}{\Lambda},$$

where Λ is 315 nm, a second plot 1226 representing second order drop, a third plot 1228 representing self Bragg coupling and a fourth plot 1230 representing third order drop. The graph 1200A is plotted using calculated values of $\beta 1+\beta 2$ and $2\pi/\Lambda$ to show the corresponding Bragg wavelengths for each of the spectral features of interest measured in FIG. 11A.

Figure 12B:
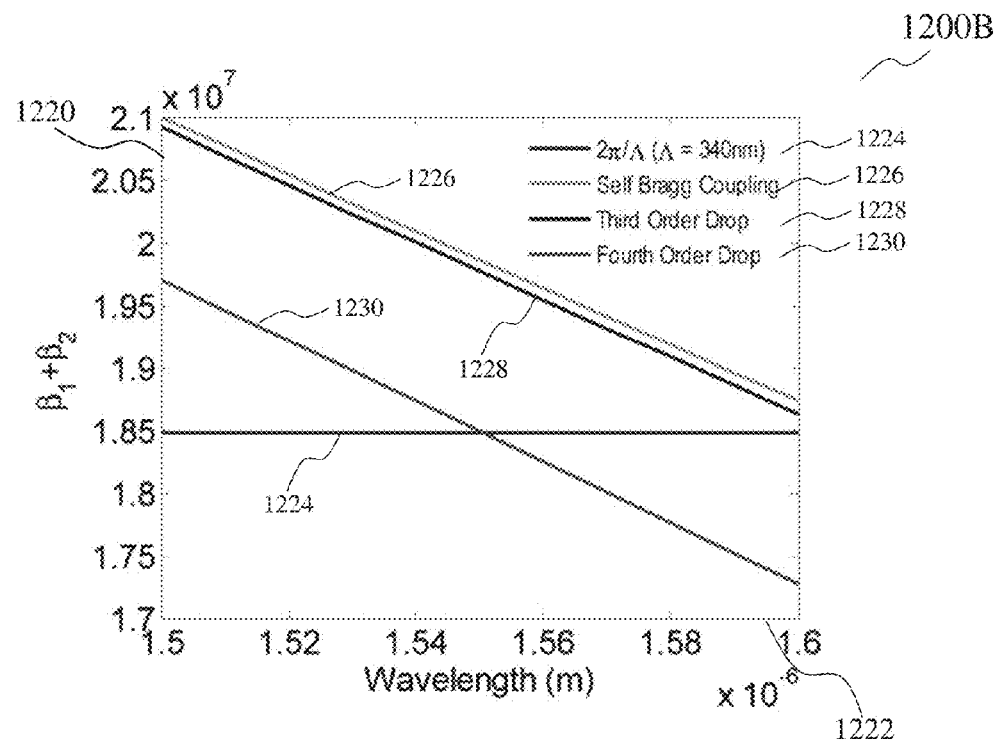
FIG. 12B shows a graph that shows the sum of propagation constants as a function of wavelength corresponding to the third and fourth order modes.

FIG. 12B shows a graph 1200B that shows the sum of propagation constants as a function of wavelength corresponding to the third and fourth order modes. The graph 1200B includes a vertical axis 1220 indicating the sum of propagation constants, and a horizontal axis indicating wavelength in meters. The graph 1200B further includes a first plot 1224 representing $$\frac{2\pi}{\Lambda},$$

where Λ is 340 nm, a second plot 1226 representing second order drop, a third plot 1228 representing self Bragg coupling and a fourth plot 1230 representing third order drop. The graph 1200B is plotted using calculated values of $\beta 1+\beta 2$ and $2\pi/\Lambda$ to show the corresponding Bragg wavelengths for each of the spectral features of interest measured in FIG. 11B.

The graphs 1200A and 1200B show good agreement with the measurements shown in the graphs 1100A and 1100B, for each of the spectral features of interest. The stop band from self-Bragg coupling may be designed to be outside of the C-band by introducing phase shifts between the right and left waveguides or by appropriately designing the input waveguide width to shift its stop band outside of the C-band.

The experiment demonstrated that the optical device is capable of multiplexing second to fourth order modes. The higher order modes are observed to have stronger extinction ratios and larger drop port bandwidths, implying a stronger coupling coefficient. The drop port bandwidth may be tailored by changing the gap width of the coupled grating, such that multiplexed modes may have the same drop port bandwidth regardless of mode order. Since the location of the drop port may also be tailored using the grating period, strategies combining both wavelength (for example, up to 100 channels within the C-band) and mode division multiplexing (for example, 3 to 5 modes) may be employed to achieve transmission capacities two orders of magnitude greater than that available to a single transmission medium. Operation by way of counter-propagating modes in periodic structures enables the optical device to combine its mode division multiplexing capabilities with wavelength division multiplexing functionalities to further augment the multiplexing capacity of the optical device.

Figure 13:
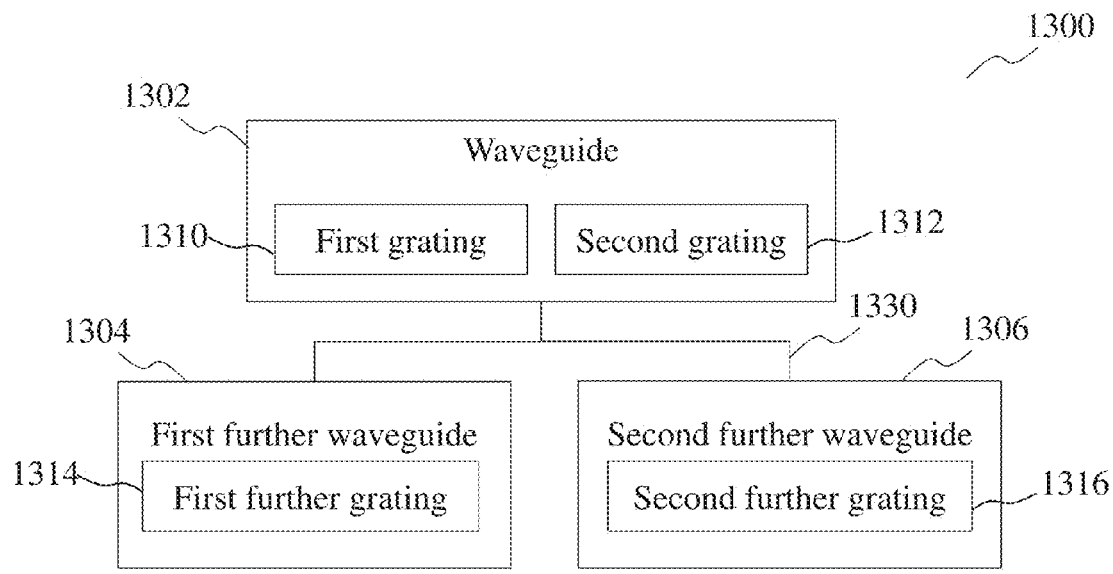
FIG. 13 shows a conceptual diagram of an optical device according to various embodiments.

FIG. 13 shows a conceptual diagram of an optical device 1300 according to various embodiments. The optical device 1300 may include a waveguide 1302 configured to propagate an electromagnetic wave. The waveguide 1302 may include a first grating 1310 and a second grating 1312. The optical device 1300 may further include a first further waveguide 1304 having a first width. The first further waveguide 1304 may include a first further grating 1314. The first further grating 1314 may be coupled to the first grating 1310 to form a first pair of coupled gratings. A grating period of the first further grating 1314 may be at least substantially equal to a grating period of the first grating 1310. The optical device 1300 may further include a second further waveguide 1306 having a second width. The second further waveguide 1306 may include a second further grating 1316. The second further grating 1316 may be coupled to the second grating 1312 to form a second pair of coupled gratings. A grating period of the second further grating 1316 may be at least substantially equal to a grating period of the second grating 1312.

In other words, the optical device 1300 may be identical to, similar to, or may include the optical device 100A, 100B or 300. The waveguide 1302 may be similar to the input waveguide 102 or the primary waveguide 302. The first grating 1310 may be similar to the input grating 124 or any one of the primary gratings 330A-330H. The second grating 1312 may be similar to the input grating 124 or another primary grating from primary gratings 330A-330H. The first further waveguide 1304 may be similar to the output waveguide 104 or one of the secondary waveguides 304A-304H. The second further waveguide 1306 may be similar to the output waveguide 104 or another one of the secondary waveguides 304A-304H. The first further grating 1314 may be similar to the output grating 126 or the secondary gratings of any one of the secondary waveguides 304A-304H. The second further grating 1316 may be similar to the output grating 126 or the secondary gratings of another one of the secondary waveguides 304A-304H. The waveguide 1302, the first further waveguide 1304 and the second further waveguide 1306 may be coupled with each other, like indicated by lines 1330, for example optically coupled, for example through gratings such as the first grating 1310, the second grating 1312, the first further grating 1314 and the second further grating 1316, electrically coupled, for example using a line or a cable, and/or mechanically coupled.

Figure 14:
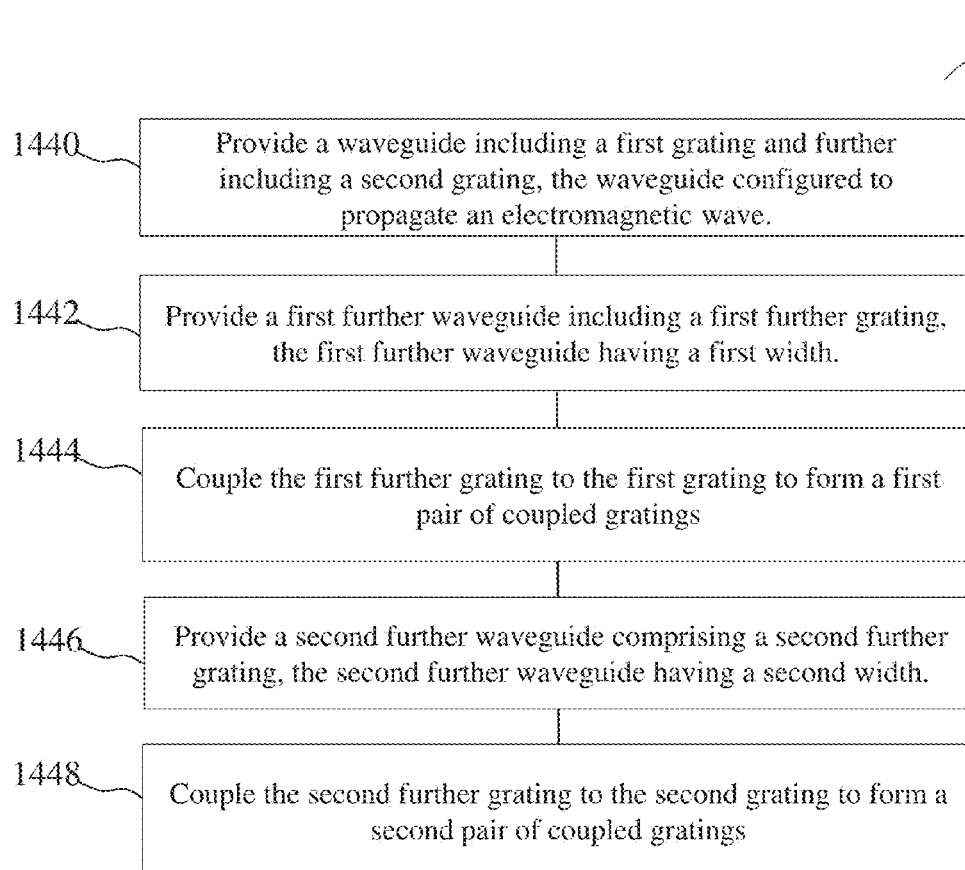
FIG. 14 shows a flow diagram of a method for fabricating an optical device according to various embodiments.

FIG. 14 shows a flow diagram 1400 of a method for fabricating an optical device, according to various embodiments. The optical device may be the optical device 100A, 100B, 300 or 1300. Process 1440 may include providing a waveguide that is configured to propagate an electromagnetic wave. The waveguide may include a first grating and a second grating. Process 1442 may include providing a first further waveguide. The first further waveguide may have a first width, and may include a first further grating. Process 1444 may include coupling the first further grating to the first grating to form a first pair of coupled gratings. The first further grating and the first grating may have a common grating period. Process 1446 may include providing a second further waveguide. The second further waveguide may have a second width, and may include a second further grating. Process 1448 may include coupling the second further grating to the second grating to form a second pair of coupled gratings. The second further grating and the second grating may have a common grating period. The common grating period of the second further grating and the second grating may be different from the common grating period of the first further grating and the first grating. Processes 1440, 1442 and 1446 may include fabricating a waveguide structure on a substrate. Processes 1440, 1442 and 1446 may further include fabricating a plurality of corrugations. The substrate may include at least one of silicon chip, silicon nitride, silicon rich nitride, doped silica, gallium arsenide, indium gallium arsenide phosphide, silicon nitride on silicon dioxide, silicon-rich nitride on silica, doped silica on silica, silicon on sapphire or gallium arsenide on aluminum gallium arsenide.

According to various embodiments, an optical device 100A may be fabricated on a SOI wafer. The SOI wafer may include a layer of silicon over an oxide layer. The optical device may be fabricated using electron-beam lithography followed by reactive ion etching. A cladding layer may be deposited over the fabricated structure using plasma-enhanced chemical vapor deposition.

The following examples pertain to further embodiments.

Example 1 is an optical device including a waveguide configured to propagate an electromagnetic wave, the waveguide including a first grating and a second grating; a first further waveguide including a first further grating, the first further waveguide having a first width, wherein the first further grating is coupled to the first grating to form a first pair of coupled gratings, wherein a grating period of the first further grating is at least substantially equal to a grating period of the first grating; a second further waveguide including a second further grating, the second further waveguide having a second width, wherein the second further grating is coupled to the second grating to form a second pair of coupled gratings, wherein a grating period of the second further grating is at least substantially equal to a grating period of the second grating.

In example 2, the subject-matter of example 1 can optionally include that the grating period of the first grating is different from the grating period of the second grating.

In example 3, the subject-matter of example 1 or example 2 can optionally include that each of the first grating, second grating, first further grating and second further grating includes a plurality of corrugations, wherein the plurality of corrugations run at least substantially perpendicular to a length and a width of the respective waveguide.

In example 4, the subject-matter of example 3 can optionally include that the plurality of corrugations are shaped at least substantially sinusoidal or rectangular.

In example 5, the subject-matter of example 3 or example 4 can optionally include that the plurality of corrugations are cladding-based corrugations.

In example 6, the subject-matter of any one of examples 3 to 5 can optionally include that the plurality of corrugations are at least substantially equally spaced.

In example 7, the subject-matter of any one of examples 1 to 6 can optionally include that each of the first grating and the first further grating has an at least substantially identical modulation depth.

In example 8, the subject-matter of any one of example 1 to 7 can optionally include that each of the second grating and the second further grating has an at least substantially identical modulation depth.

In example 9, the subject-matter of any one of examples 1 to 8 can optionally include that each of the first pair of coupled gratings and the second pair of coupled gratings includes an apodization filter.

In example 10, the subject-matter of example 9 can optionally include that the apodization filter is configured to provide a filter function in accordance with one of raised cosine, cosine, Blackman, hyperbolic tangent, Connes, Gaussian, Hamming, Hanning or Welch.

In example 11, the subject-matter of any one of examples 1 to 10 can optionally include that each of the waveguide, the first further waveguide and the second further waveguide is fabricated on at least one of silicon, silicon nitride, silicon rich nitride, doped silica, gallium arsenide, indium gallium arsenide phosphide, silicon nitride on silicon dioxide, silicon-rich nitride on silica, doped silica on silica, silicon on sapphire, or gallium arsenide on aluminum gallium arsenide.

In example 12, the subject-matter of any one of examples 1 to 11 can optionally include that the waveguide is a single-mode waveguide.

In example 13, the subject-matter of any one of examples 1 to 12 can optionally include that at least one of the first further waveguide or the second further waveguide is a multi-mode waveguide.

In example 14, the subject-matter of any one of examples 1 to 13 can optionally include that the first pair of coupled gratings is configured to couple a first further electromagnetic wave into the first further waveguide; and wherein the second pair of coupled gratings is configured to couple a second further electromagnetic wave into the second further waveguide.

In example 15, the subject-matter of example 14 can optionally include that the grating period of the second grating is larger than the grating period of the first grating, wherein the second further electromagnetic wave has a higher mode order than the first further electromagnetic wave.

In example 16, the subject-matter of example 14 can optionally include that the grating period of the second grating is larger than the grating period of the first grating, wherein the second further electromagnetic wave has a larger add/drop wavelength than the first further electromagnetic wave, wherein the second further electromagnetic wave and the first further electromagnetic wave have a common mode order.

In example 17, the subject-matter of example 14 can optionally include that the grating period of the second grating is smaller than the grating period of the first grating, wherein the second further electromagnetic wave has a smaller add/drop wavelength than the first further electromagnetic wave, wherein the second further electromagnetic wave and the first further electromagnetic wave have a common mode order.

In example 18, the subject-matter of any one of examples 14 to 17 can optionally include that an add/drop wavelength of the first further electromagnetic wave is dependent on each of the grating period of the first grating, the first width and a mode order of the first further electromagnetic wave; and wherein an add/drop wavelength of the second further electromagnetic wave is dependent on each of the grating period of the second grating, the second width and a mode order of the second further electromagnetic wave.

Example 19 is a method for fabricating an optical device, the method including: providing a waveguide including a first grating and a second grating, the waveguide configured to propagate an electromagnetic wave; providing a first further waveguide including a first further grating, the first further waveguide having a first width; coupling the first further grating to the first grating to form a first pair of coupled gratings, wherein a grating period of the first further grating is at least substantially equal to a grating period of the first grating; providing a second further waveguide including a second further grating, the second further waveguide having a second width; coupling the second further grating to the second grating to form a second pair of coupled gratings, wherein a grating period of the second further grating is at least substantially equal to a grating period of the second grating.

In example 20, the subject-matter of example 19 can optionally include that each of providing the waveguide, providing the first further waveguide and providing the second further waveguide includes fabricating a waveguide structure on a substrate.

In example 21, the subject-matter of example 20 can optionally include that the substrate is at least one of a silicon chip, silicon nitride, silicon rich nitride, doped silica, gallium arsenide, indium gallium arsenide phosphide, silicon nitride on silicon dioxide, silicon-rich nitride on silica, doped silica on silica, silicon on sapphire, or gallium arsenide on aluminum gallium arsenide.

In example 22, the subject-matter of example 20 or example 21 can optionally include that each of providing the waveguide, providing the first further waveguide and providing the second further waveguide includes fabricating a plurality of corrugations, wherein the plurality of corrugations run at least substantially perpendicular to a length and a width of the respective waveguide.

In example 23, the subject-matter of example 22 can optionally include that fabricating the plurality of corrugations includes fabricating one of at least substantially sinusoidally-shaped corrugations or at least substantially rectangularly-shaped corrugations.

In example 24, the subject-matter of example 22 or example 23 can optionally include that fabricating the plurality of corrugations includes providing the plurality of corrugations on a cladding.

In example 25, the subject-matter of any one of examples 22 to 24 can optionally include that fabricating the plurality of corrugations includes fabricating at least substantially equally-spaced corrugations.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced. It will be appreciated that common numerals, used in the relevant drawings, refer to components that serve a similar or the same purpose.

The invention claimed is:

1. An optical device comprising:
a waveguide configured to propagate an electromagnetic wave, the waveguide comprising a first grating and a second grating;
a first further waveguide comprising a first further grating, the first further waveguide having a first width,
wherein the first further grating is coupled to the first grating to form a first pair of coupled gratings, wherein a grating period of the first further grating is at least substantially equal to a grating period of the first grating;
a second further waveguide comprising a second further grating, the second further waveguide having a second width,
wherein the second further grating is coupled to the second grating to form a second pair of coupled gratings, wherein a grating period of the second further grating is at least substantially equal to a grating period of the second grating;
wherein each of the first grating, second grating, first further grating and second further grating comprises a plurality of corrugations, wherein the plurality of corrugations run at least substantially perpendicular to a length and a width of the respective waveguide.

2. The optical device of claim 1, wherein the grating period of the first grating is different from the grating period of the second grating.

3. The optical device of claim 1, wherein the plurality of corrugations are shaped at least substantially sinusoidal or rectangular.

4. The optical device of claim 1, wherein the plurality of corrugations are cladding-based corrugations.

5. The optical device of claim 1, wherein the plurality of corrugations are at least substantially equally spaced.

6. The optical device of claim 1, wherein each of the first grating and the first further grating has an at least substantially identical modulation depth.

7. The optical device of claim 1, wherein each of the second grating and the second further grating has an at least substantially identical modulation depth.

8. The optical device of claim 1, wherein each of the first pair of coupled gratings and the second pair of coupled gratings comprises an apodization filter.

9. The optical device of claim 8, wherein the apodization filter is configured to provide a filter function in accordance with one of raised cosine, cosine, Blackman, hyperbolic tangent, Connes, Gaussian, Hamming, Hanning or Welch.

10. The optical device of claim 1, wherein each of the waveguide, the first further waveguide and the second further waveguide is fabricated on at least one of silicon, gallium arsenide, silicon nitride, silicon rich nitride, doped silica, indium gallium arsenide phosphide, silicon nitride on silicon dioxide, silicon-rich nitride on silica, doped silica on silica, silicon on sapphire, or gallium arsenide on aluminum gallium arsenide.

11. The optical device of claim 1, wherein the waveguide is a single-mode waveguide.

12. The optical device of claim 1, wherein at least one of the first further waveguide or the second further waveguide is a multi-mode waveguide.

13. The optical device of claim 1, wherein the first pair of coupled gratings is configured to couple a first further electromagnetic wave into the first further waveguide; and wherein the second pair of coupled gratings is configured to couple a second further electromagnetic wave into the second further waveguide.

14. The optical device of claim 13, wherein the grating period of the second grating is larger than the grating period of the first grating, wherein the second further electromagnetic wave has a higher mode order than the first further electromagnetic wave.

15. The optical device of claim 13, wherein the grating period of the second grating is larger than the grating period of the first grating, wherein the second further electromagnetic wave has a larger add/drop wavelength than the first further electromagnetic wave, wherein the second further electromagnetic wave and the first further electromagnetic wave have a common mode order.

16. The optical device of claim 13, wherein the grating period of the second grating is smaller than the grating period of the first grating, wherein the second further electromagnetic wave has a smaller add/drop wavelength than the first further electromagnetic wave, wherein the second further electromagnetic wave and the first further electromagnetic wave have a common mode order.

17. The optical device of claim 13, wherein an add/drop wavelength of the first further electromagnetic wave is dependent on each of the grating period of the first grating, the first width and a mode order of the first further electromagnetic wave; and wherein an add/drop wavelength of the second further electromagnetic wave is dependent on each of the grating period of the second grating, the second width and a mode order of the second further electromagnetic wave.

18. A method for fabricating an optical device, the method comprising:
   providing a waveguide comprising a first grating and a second grating, the waveguide configured to propagate an electromagnetic wave;
   providing a first further waveguide comprising a first further grating, the first further waveguide having a first width;
   coupling the first further grating to the first grating to form a first pair of coupled gratings, wherein a grating period of the first further grating is at least substantially equal to a grating period of the first grating;
   providing a second further waveguide comprising a second further grating, the second further waveguide having a second width;
   coupling the second further grating to the second grating to form a second pair of coupled gratings, wherein a grating period of the second further grating is at least substantially equal to a grating period of the second grating;
   providing a plurality of corrugations in each of the first grating, second grating, first further grating and second further grating, wherein the plurality of corrugations run at least substantially perpendicular to a length and a width of the respective waveguide.

19. The method of claim 18, wherein each of providing the waveguide, providing the first further waveguide and providing the second further waveguide comprises fabricating a waveguide structure on a substrate.

* * * * *